US008365848B2

(12) United States Patent
Won

(10) Patent No.: US 8,365,848 B2
(45) Date of Patent: Feb. 5, 2013

(54) ROBOTIC PLATFORM

(75) Inventor: Chikyung Won, Tewksbury, MA (US)

(73) Assignee: iRobot Corporation, Bedford, MA (US)

( * ) Notice: Subject to any disclaimer, the term of this patent is extended or adjusted under 35 U.S.C. 154(b) by 375 days.

(21) Appl. No.: 12/140,371

(22) Filed: Jun. 17, 2008

(65) Prior Publication Data

US 2009/0065271 A1    Mar. 12, 2009

Related U.S. Application Data

(60) Continuation of application No. 10/745,941, filed on Dec. 24, 2003, now Pat. No. 7,597,162, which is a division of application No. 10/202,376, filed on Jul. 24, 2002, now Pat. No. 6,668,951, which is a division of application No. 09/888,760, filed on Jun.

(Continued)

(51) Int. Cl.
*B62D 55/065* (2006.01)
(52) U.S. Cl. .................. 180/9.32; 180/8.2; 180/9.1
(58) Field of Classification Search .................. 180/8.2, 180/9.1, 9.32, 9.4, 901, 9.52; 305/139, 6, 305/127, 124, 199, 120, 126, 165, 195; 280/5.2, 280/5.22, 5.28; 446/433; 901/1
See application file for complete search history.

(56) References Cited

U.S. PATENT DOCUMENTS

| 549,795 A | 11/1895 | Ingleton |
| 967,740 A | 8/1910 | Dorffel |
| 1,069,761 A | 8/1913 | Buckley |
| 1,080,649 A | 12/1913 | Morgan |
| 1,348,590 A | 8/1920 | Shea |
| 1,383,425 A | 7/1921 | Ray |
| 1,509,982 A | 9/1924 | Schoeneck et al. |
| 1,522,315 A | 1/1925 | Nash |

(Continued)

FOREIGN PATENT DOCUMENTS

| DE | 1630748 | 1/1971 |
| DE | 3317376 | 11/1984 |

(Continued)

OTHER PUBLICATIONS

"4. The Tympanic-nerve Response in Noctuid Moths" *Tympanic Response in Moths*, 34-99.

(Continued)

*Primary Examiner* — Anne Marie M Boehler
(74) *Attorney, Agent, or Firm* — Fish & Richardson P.C.

(57) ABSTRACT

An articulated tracked vehicle that has a main section, which includes a main frame, and a forward section. The main frame has two sides and a front end, and includes a pair of parallel main tracks. Each main track includes a flexible continuous belt coupled to a corresponding side of the main frame. The forward section includes an elongated arm. One end of the arm is pivotally coupled to the main frame near the forward end of the main frame about a transverse axis that is generally perpendicular to the sides of the main frame. The arm has a length sufficiently long to allow the forward section to extend below the main section in at least some degrees of rotation of the arm, and a length shorter than the length of the main section. The center of mass of the main section is located forward of the rearmost point reached by the end of the arm in its pivoting about the transverse axis. The main section is contained within the volume defined by the main tracks and is symmetrical about a horizontal plane, thereby allowing inverted operation of the robot.

29 Claims, 20 Drawing Sheets

Related U.S. Application Data 25, 2001, now Pat. No. 6,431,296, which is a division of application No. 09/237,570, filed on Jan. 26, 1999, now Pat. No. 6,263,989.

(60) Provisional application No. 60/096,141, filed on Aug. 11, 1998, provisional application No. 60/079,701, filed on Mar. 27, 1998.

(56) References Cited

U.S. PATENT DOCUMENTS

| | | |
|---|---|---|
| 1,591,730 A | 7/1926 | Wick |
| 1,592,654 A | 7/1926 | Bremer |
| 1,625,518 A | 4/1927 | Beisel |
| 1,639,827 A | 8/1927 | Wayne |
| 1,858,723 A | 5/1932 | Weaver |
| 2,917,120 A | 12/1959 | Gates et al. |
| 3,068,950 A | 12/1962 | Davidson |
| 3,092,200 A | 6/1963 | Chambers |
| 3,166,138 A | 1/1965 | Dunn, Jr. |
| 3,198,534 A | 8/1965 | Porter |
| 3,231,290 A | 1/1966 | Weyer |
| 3,235,020 A | 2/1966 | Bekker |
| 3,276,531 A * | 10/1966 | Hale et al. .................. 180/9.23 |
| 3,283,839 A | 11/1966 | Brown et al. |
| 3,288,234 A | 11/1966 | Feliz |
| 3,292,722 A | 12/1966 | Bamberg |
| 3,311,424 A | 3/1967 | Taylor |
| 3,417,832 A | 12/1968 | Ziccardi |
| 3,489,236 A | 1/1970 | Goodwin |
| 3,533,483 A | 10/1970 | Ballinger |
| 3,540,151 A | 11/1970 | Ishida |
| 3,609,804 A | 10/1971 | Morrison |
| 3,649,981 A | 3/1972 | Woodworth |
| 3,717,390 A | 2/1973 | Parisotto et al. |
| 3,799,362 A | 3/1974 | Oswald et al. |
| 3,809,004 A | 5/1974 | Leonheart |
| 3,869,011 A | 3/1975 | Jensen |
| 3,888,181 A | 6/1975 | Kups |
| 3,891,234 A | 6/1975 | Auer et al. |
| 3,929,006 A | 12/1975 | Boggs et al. |
| 4,009,761 A | 3/1977 | Meyer |
| 4,027,889 A | 6/1977 | Krofchalk et al. |
| 4,202,037 A | 5/1980 | Glaser et al. |
| 4,209,942 A | 7/1980 | Lohr |
| 4,234,850 A | 11/1980 | Collins |
| 4,247,125 A | 1/1981 | Rayment |
| 4,253,132 A | 2/1981 | Cover |
| 4,301,884 A | 11/1981 | Taylor |
| 4,369,989 A | 1/1983 | Mankey |
| 4,380,807 A | 4/1983 | Reynard |
| RE31,509 E | 1/1984 | Neidell |
| 4,447,093 A | 5/1984 | Cunard et al. |
| 4,470,048 A | 9/1984 | Short |
| 4,477,998 A | 10/1984 | You |
| 4,483,407 A | 11/1984 | Iwamoto et al. |
| 4,566,550 A | 1/1986 | Misawa |
| 4,566,551 A | 1/1986 | Feliz |
| 4,570,953 A | 2/1986 | McPeak et al. |
| 4,570,954 A | 2/1986 | Mintz |
| 4,596,144 A | 6/1986 | Panton et al. |
| 4,598,942 A | 7/1986 | Shum et al. |
| 4,620,285 A | 10/1986 | Perdue |
| 4,666,102 A | 5/1987 | Colbaugh et al. |
| 4,671,369 A | 6/1987 | Tiffin et al. |
| 4,671,774 A * | 6/1987 | Owsen ............................. 440/95 |
| 4,674,047 A | 6/1987 | Tyler et al. |
| 4,674,585 A | 6/1987 | Barlow et al. |
| 4,679,152 A | 7/1987 | Perdue |
| 4,685,396 A | 8/1987 | Birse et al. |
| 4,687,198 A | 8/1987 | Smith et al. |
| 4,688,813 A | 8/1987 | Misawa et al. |
| 4,702,331 A | 10/1987 | Hagihara et al. |
| 4,709,773 A | 12/1987 | Clement et al. |
| 4,730,684 A | 3/1988 | Pedersen |
| 4,736,826 A | 4/1988 | White et al. |
| 4,813,906 A | 3/1989 | Matsuyama et al. |
| 4,828,059 A * | 5/1989 | Naito et al. .................. 180/119 |
| 4,831,565 A | 5/1989 | Woodward |
| 4,832,098 A | 5/1989 | Palinkas et al. |
| 4,842,207 A | 6/1989 | Kinnan |
| 4,884,506 A | 12/1989 | Guerreri |
| 4,897,512 A | 1/1990 | Johnston |
| 4,898,256 A | 2/1990 | Lehner |
| 4,919,489 A | 4/1990 | Kopsco |
| 4,932,491 A | 6/1990 | Collins, Jr. |
| 4,932,831 A | 6/1990 | White et al. |
| 4,962,941 A | 10/1990 | Rembos |
| 4,977,971 A | 12/1990 | Crane et al. |
| 4,992,998 A | 2/1991 | Woodward |
| 4,993,912 A | 2/1991 | King et al. |
| 5,007,599 A | 4/1991 | Forsyth |
| 5,022,812 A | 6/1991 | Coughlan et al. |
| 5,056,612 A | 10/1991 | Roumagnac |
| 5,090,321 A | 2/1992 | Abouav |
| D327,038 S | 6/1992 | Oliver |
| 5,123,495 A | 6/1992 | Littlejohn et al. |
| 5,173,881 A | 12/1992 | Sindle |
| 5,174,405 A | 12/1992 | Carra et al. |
| 5,197,558 A | 3/1993 | Misawa |
| 5,248,008 A | 9/1993 | Clar |
| 5,277,065 A | 1/1994 | Leszczynski |
| 5,280,981 A | 1/1994 | Schulz |
| 5,308,098 A | 5/1994 | Shea |
| 5,323,867 A | 6/1994 | Griffin et al. |
| 5,337,846 A | 8/1994 | Ogaki et al. |
| 5,363,935 A | 11/1994 | Schempf et al. |
| 5,413,367 A | 5/1995 | Ochiai |
| 5,429,543 A | 7/1995 | Tibor et al. |
| 5,435,405 A | 7/1995 | Schempf et al. |
| 5,438,247 A | 8/1995 | Kim et al. |
| 5,442,358 A | 8/1995 | Keeler et al. |
| 5,443,354 A | 8/1995 | Stone et al. |
| 5,447,317 A | 9/1995 | Gehlsen et al. |
| 5,451,135 A | 9/1995 | Schempf et al. |
| 5,465,525 A | 11/1995 | Mifune et al. |
| 5,471,560 A | 11/1995 | Allard et al. |
| 5,498,940 A | 3/1996 | Kim et al. |
| 5,502,358 A | 3/1996 | Lee et al. |
| 5,507,358 A | 4/1996 | Abe et al. |
| 5,511,147 A | 4/1996 | Abdel-Malek |
| 5,515,934 A | 5/1996 | Davis |
| 5,520,114 A | 5/1996 | Guimard et al. |
| 5,551,545 A | 9/1996 | Gelfman |
| 5,563,366 A | 10/1996 | La Mura et al. |
| 5,579,857 A | 12/1996 | Abe et al. |
| 5,641,030 A | 6/1997 | Toselli |
| 5,647,554 A | 7/1997 | Ikegami et al. |
| 5,652,849 A | 7/1997 | Conway et al. |
| 5,675,229 A | 10/1997 | Thorne |
| 5,717,169 A | 2/1998 | Liang et al. |
| 5,742,975 A | 4/1998 | Knowlton et al. |
| 5,752,871 A | 5/1998 | Tsuzuki |
| 5,764,888 A | 6/1998 | Bolan et al. |
| 5,767,437 A | 6/1998 | Rogers |
| 5,833,248 A | 11/1998 | Eguchi |
| 5,868,403 A | 2/1999 | Culp et al. |
| 5,884,718 A | 3/1999 | Yamashiro et al. |
| 5,921,843 A | 7/1999 | Skrivan et al. |
| 5,944,131 A | 8/1999 | Schaffner et al. |
| 5,984,880 A | 11/1999 | Lander et al. |
| 6,046,565 A | 4/2000 | Thorne |
| 6,088,020 A | 7/2000 | Mor |
| 6,108,031 A | 8/2000 | King et al. |
| 6,108,269 A | 8/2000 | Kabel |
| 6,113,343 A | 9/2000 | Goldenberg et al. |
| 6,113,395 A | 9/2000 | Hon |
| 6,144,180 A | 11/2000 | Chen et al. |
| 6,154,694 A | 11/2000 | Aoki et al. |
| 6,158,536 A | 12/2000 | Misawa |
| 6,173,651 B1 | 1/2001 | Pathe et al. |
| 6,196,343 B1 | 3/2001 | Strautnieks |
| 6,216,807 B1 | 4/2001 | Eckhoff |
| 6,250,409 B1 | 6/2001 | Wells |

| | | | |
|---|---|---|---|
| 6,263,989 B1 | 7/2001 | Won |
| 6,267,196 B1 | 7/2001 | Wilcox et al. |
| 6,283,034 B1 | 9/2001 | Miles, Jr. |
| 6,332,400 B1 | 12/2001 | Meyer |
| 6,336,642 B1 | 1/2002 | Carstens |
| 6,431,296 B1 | 8/2002 | Won |
| 6,480,762 B1 | 11/2002 | Uchikubo et al. |
| 6,490,977 B1 | 12/2002 | Bossarte et al. |
| 6,535,793 B2 | 3/2003 | Allard |
| 6,557,104 B2 | 4/2003 | Vu et al. |
| 6,615,885 B1 | 9/2003 | Ohm |
| 6,624,744 B1 | 9/2003 | Wilson et al. |
| 6,662,889 B2 | 12/2003 | De Fazio et al. |
| 6,668,951 B2 | 12/2003 | Won |
| 6,725,986 B2 | 4/2004 | Reindle et al. |
| 6,860,206 B1 | 3/2005 | Rudakevych et al. |
| 6,870,792 B2 | 3/2005 | Chiappetta |
| 6,988,854 B2 | 1/2006 | Porter |
| 7,143,696 B2 | 12/2006 | Rudakevych et al. |
| 7,597,162 B2 | 10/2009 | Won |
| 2001/0020200 A1 | 9/2001 | Das et al. |
| 2001/0025118 A1 | 9/2001 | Nadaka et al. |
| 2001/0043509 A1 | 11/2001 | Green et al. |
| 2001/0045883 A1 | 11/2001 | Holdaway et al. |
| 2006/0027127 A1 | 2/2006 | Cerovic et al. |
| 2007/0072662 A1 | 3/2007 | Templeman |
| 2007/0097592 A1 | 5/2007 | Smith |
| 2007/0119326 A1 | 5/2007 | Rudakevych et al. |
| 2007/0156286 A1 | 7/2007 | Yamuchi |

FOREIGN PATENT DOCUMENTS

| | | |
|---|---|---|
| DE | 3404202 | 5/1987 |
| DE | 3622076 | 1/1988 |
| EP | 0206930 | 12/1986 |
| EP | 0386729 | 3/1990 |
| EP | 433697 | 6/1991 |
| GB | 875691 | 8/1961 |
| GB | 2128842 | 5/1984 |
| GB | 2230608 | 10/1990 |
| GB | 2280650 | 2/1995 |
| JP | 356069569 | 6/1981 |
| JP | 58-191673 | 5/1982 |
| JP | 59-38177 | 3/1984 |
| JP | 60176871 | 9/1985 |
| JP | 06-032263 | 2/1994 |
| JP | 8152916 A2 | 6/1996 |
| JP | 11149315 | 6/1999 |
| JP | 2000094373 | 4/2000 |
| NL | 1002503 | 9/1996 |
| WO | WO 89/00928 | 2/1989 |
| WO | WO 99/05580 | 2/1999 |
| WO | WO 01/74652 | 10/2001 |
| WO | WO 01/84260 | 11/2001 |
| WO | WO 02/12917 | 2/2002 |

OTHER PUBLICATIONS

Azarbayejani et al., "Real-time Self-Calibrating Stereo Person Tracking Using 3-D Shpe Estimation from Blob Features" Proceedings of the 1996 IEEE/ICPR, 627-632, 1996.
Ballard et al., "Computer Vision", Upper Saddle River, New Jersey: Prentice Hall, 1982, Book available upon request.
Bascle et al., "Region Tracking through image sequences" 1995 IEEE, 302-307, 1995.
Blazevic et al., "Mobile robot using ultrasonic sensors: study of a degraded mode" *Robotica* 9:365-370, 1991.
Borenstein and Koren, "Noise Rejection for Ultrasonic Sensors in Mobile Robot Applications", Proceeding of the 1992 IEEE International Conference on Robotics and Automation, Nice, France, 1727-1732, 1992.
Borenstein and Koren, "Real-Time Obstacle Avoidance for Fast Mobile Robots", Transactions on Systems, Man, and Cybernetics, vol. 19, 1179-1187, 1989.
Bozma et al., "Building a Sonar Map in a Specular Environment Using a Single Mobile Sensor" *IEEE Transactions on Pattern Analysis and Machine Intelligence* 13:(12):1260-1269, 1991.
Bozma et al., "Characterizing the Environment Using Echo Energy, Duration, and Range: the ENDURA Method" *Proceedings of the 1992 IEEE/RSJ International Conference on Intelligent Robots and Systems*, Raleigh, NC, 813-820, 1992.
Coombs et al., "Real-Time Binocular Smooth Pursuit", International Journal of Computer vision, 147-164, 1993.
Corbett et al., "A Human Factors Tested for Ground-Vehicle Telerobotic Research", Proceedings-0990 Southeastcon, 618-620, 1990.
Drotning et al., "A VMEbus Ultrasonic Sensor Controller for Mapping and Servo Control in Robotic Systems" *Intelligent Systems Department II, Sandia National Laboratories*, Albuquerque, NM, 37-44.
Durlach et al., "Position Tracking and Mapping", National Academy Press, 188-204, 1995.
Durlach et al., "The Visual Channel", National Academy Press, 111-133, 1995.
Elfes "A Sonar-Based Mapping and Navigational System" *IEEE*, 1151-1156, 1986.
Everett "A Multi-Element Ultra Sonic Ranging Array" *Naval Sea Systems Command*, Washington, DC, pp. i-58, 1985.
Gibson et al., "Motion Parallax as a Determinant of Perceived Depth", Journal of Experimental Psychology, vol. 58, 40-51, 1959.
Green, et al., "Telepresence surgery", IEEEE, pp. 324-329. 1995.
Gresham, John, "March of the Robots", Robots, 175-185.
Higuchi et al., "B-Mode Imaging Using Si Ultrasonic Image Sensor" *Microelectronics Research Laboratories, NEC Corporation*, Shimokuzawa, Sagamihara, Kanagawa 229, Japan, *R&D Laboratory, NEC Home Electronics Ltd.*, Takatsu-ku, Kawasaki, Kanagawa 213, Japan, *C&C Systems Research Laboratories, NEC Corporation*, Miyamae-ku, Kawasaki, Kanagawa 213, Japan, 1-6, Figs. 1-8.
Hong et al., "Analysis of Ultrasonic Differentiation of Three Dimensional Corners, Edges and Planes", *Proceedings of the 1992 IEEE, International Conference on Robotics and Automation*, Nice, France, 580-584, 1992.
Horiguchi "A Digital Phase Delay Compensation Beam-Forming Scheme for Ultrasonic Imaging" *Journal of Applied Physics* 27(27-1):215-217, 1988.
Huttenlocker et al., "A Multi-Resolution Technique for comparing Images Using the Hausdorff Distance", 1993 IEEE, 705-706, 1993.
Huttenlocker, et al., "Visually-Guided Navigation by Comparing Two-Dimensional Edge Images" TR 94-1407, Jan. 1994, 1-18, 1994.
IRobot, "Here are just a few of the uses of the iRobot-LE", www.irobot.com/ir/index.htm, 2000.
Kass et al., "Snakes: Active Contour Models", International Journal of Computer Vision, 321-331, 1988.
Kay "Airborne Ultrasonic Imaging of a Robot Workspace" University of Canterbury, New Zealand, 287-296.
Kuc "Three-dimensional tracking using qualitative bionic sonar" Robotics and Autonomous Systems *Elsevier Science* 11:213-219, 1993.
Kuc and Siegel, "Efficient Representation of Reflecting Structures for a Sonar Naviagtion Model", IEEE, pp. 1916-1923, 1987.
Kuc and Viard, "Guiding Vehicles with Sonar: The Edge Problem", IEEE 1988 Ultrasonics Symposium, Chicago, Illinois, pp. 1-4.
Kuc et al., "A Physically Based Navigation Strategy for Sonar-Guided Vehicles", The International Journal of Robotics Research 10(2):75-87, 1991.
Kuc et al., "Docking Mobile Robots Using a Bat-like Sonar" *Proceedings of the 1992 IEEE/RSJ International Conference on Intelligent Robots and Systems*, Raleigh, NC, 1439-1444, 1992.
Kuc et al., "Navigating Vehicles Through an Unstructured Environment with Sonar", IEEE, 1422-1426, 1989.
Kuroda et al., "Ultrasonic Imaging System for Robots Using an Electronic Scanning Method" Robot Sensors, 271-285.
Lang et al., "Characterizing and modeling a sonar ring" *Mobile Robots IV* 1195:291-304, 1989.
Langer et al., "Sonar based Outdoor Vehicle Navigation and Collision Avoidance" *Proceedings of the 1992 IEEE/RSJ International Conference on Intelligent Robots and Systems*, Raleigh, NC, 1445-1450, 1992.
LeMay et al., "Error Minimization and Redundancy Management for a Three Dimensional Ultrasonic Ranging System" *Proceedings of the 1992 IEEE/RSJ International Conference on Intelligent Robots and Systems*, Raleigh, NC, 837-844, 1992.

Lim et al., "Physically Based Sensor Modeling for a Sonar Map in a Specular Environment" *Proceedings of the 1992 IEEE International Conference on Robotics and Automation*, Nice, France, 1714-1719, 1992.

Mair, The Technology and its Economic and Social Implications, *IEEE*, pp. 118-124, 1997.

Mataric "Qualitative Sonar Based Environment Learning for Mobile Robots" *Mobile Robots IV* 1195:305-314, 1989.

Matthies et al., "Integration of Sonar and Stereo Range Data Using a Grid-Based Representation" *IEEE*, 232-238, 1988.

McKerrow "Simulation of Sonar Echolocation" *Dept. of Computing Science*, University of Wollongong, Australia, 10 pages.

McKerrow et al., "An Introduction to the Physics of Echolocation" *Third Conference on Robotics, Australian Robot Association*, 1-19, 1990.

Miller et al., "Attitude and Position Control Using Real-time Color Tracking", American Association for Artificial Intelligence, 1997.

Morcuo et al., "Mobile Robot Multitarget Tracking in Dynamic Environments" *Proceedings of the 1992 IEEE/RSJ International Conference on Intelligent Robots and Systems*, Raleigh, NC, 1464-1469, 1992.

Moravec, et al., "High Resolution Maps from Wide Angle Sonar", The Robotics Institute, 116-121, 1985.

Morimoto et al., "Fast Electronic Digital Image Stabilization", 1996 IEEE, Proceedings of ICPR '96, 284-288, 1996.

Nakai, et al., "7 DOF Arm Type Haptic Interface for Teleoperation and Virtual Reality Systems", IEEE, 1266-1271, 1998.

Nagashima et al., "Ultrasonic sensing for a mobile robot to recognize an environment—Measuring the normal direction of walls—" *Proceedings of the 1992 IEEE/RSJ International Conference on Intelligent Robots and Systems*, Raleigh, NC, 805-812, 1992.

Ohashi, et al., "The Sensor Arm and the Sensor Glove II—Haptic Devieces for VR Interface", IEEE, 785, 1999.

Parnis and Drazan, "Recognition of unreliable ultrasonic range data in a robotic environment", 7 pages, 1988.

PCT Search Report from PCT Application No. PCT/US01/24395 that corresponds to U.S. Appl. No. 09/921,181.

PCT Search Report from PCT Application No. PCT/US01/13878 dated Dec. 11, 2001.

PCT Search Report from PCT Application No. PCT/US01/11017 dated Oct. 24, 2001.

Pimentel, Moreno J., "Mobile Robot Multitarget Tracking in Dynamic Environments", IEEE, 1464-1469, 1992.

Pomeroy et al., "Evaluation of ultrasonic inspection and imaging systems for robotics using TLM modelling" *Robotica* 9:283-290, 1991.

Pomeroy et al., "Ultrasonic Distance Measuring and Imaging Systems for Industrial Robots", *Robot Sensors* 2:261-270, 1986.

Rafiq et al., "The performance of capacitive ultrasonic transducers using v-grooved backplates" *Meas. Sci. Technol.* 2:168-174, 1991.

Robert T. Pack, "Sentinel Phase-II Kickoff Presentation" iRobot Corporation, 2004.

Roman et al., "Efficient representation of reflecting structures for a sonar navigation model" IEEE, 1916-23, 1987.

Rougeaux et al., "Robust Real-Time Tracking on an Active Vision Head", 873-879.

Sabatini, AM, "Active Hearing for External Imaging Based on an Ultrasonic Transducer Array", Proceedings of the 1992 IEEE/RSJ International Conference on Intelligent Robots and Systems, Raleigh, NC, Jul. 7-10, 1992, pp. 829-836.

Sandia National Laboratory, "Tactical Robotic Vehicle Aids in Battlefield Surveillance", Department of Energy, Announcement 25 No. 7, 1061-1062, 1990.

Sasaki et al., "Classification of Objects' Surface by Acoustic Transfer Function" *Proceedings of the 1992 IEEE/RSJ International Conference on Intelligent Robots and Systems*, Raleigh, NC, 821-828, 1992.

Shiele et al., "A Comparison of Position Estimation Techniques Using Occupancy Grids", IEEE, 1628-1634. 1994.

Shimoga, et al., "Touch and Force Reflection for Telepresence Surgery", *IEEE*, pp. 1049-1050, 1994.

Star tech "Tech firms showing off gadgets for consumers", www.azstarnet.com/public/startech/archive/021501/main.htm.

Sun et al., "Computer simulation of sensor-based robot collision avoidance in an unknown environment" *Proceedings of the 1992 IEEE/RSJ International Conference on Intelligent Robots and System*, Raleigh, NC, 291-302, 1986.

Swain et al., "Color Indexing" International Journal of Computer Vision, 11-32, 1991.

Takanashi et al.,"A Robotic Ultrasonic Imaging System Using a Si Phased-array Receiver" *Industrial Symposium Industrial Robots*, Kawaski, Japan, 6 pages, 1989.

Ueda et al., "Tracking Moving Contours using Energy-Minimizing Elastic Contour Models", Computer Vision—ECCV 1992, 453-457, 1992.

Usard et al., "Tracking by Stochastic Propagation of Conditional Density", $4^{th}$ European Conference on Computer Vision, Cambridge, UK, Apr. 15-18, 1996 Proceedings vol. I, 343-356, 1996.

van Turennout et al., "Following a Wall with a Mobile Robot using Ultrasonic Sensors" *Proceedings of the 1992 IEEE/RSJ International Conference on Intelligent Robots and Systems*, Raleigh, NC, 1451-1456, 1992.

Walter "The Sonar Ring: Obstacle Detection for a Mobile Robot" *IEEE* 1574-1579, 1987.

Wren, et al., "Pfinder: Real-Time Tracking of the Human Body", IEEE Transactions of Pattern Analysis and Machine Intelligence, vol. 19, No. 7, 780-785, 1997.

Yagi et al., "Map-Based Navigation for a Mobile robot with Omnidirectional Image Sensor COPIS", IEEE Transactions on Robotics and Automation, vol. 11 No. 5, 634-648, 1995.

Yamauchi, Brian, "PactBot: A Versatile Platform for Military Robotics" Proceedings of SPIE, vol. 5422, 228-238.

Yang et al., "Design of Ultrasonic Linear Array System for Multi-Object Identification" *Proceedings of the 1992 IEEE/RSJ International Conference on Intelligent Robots and Systems*, Raleigh, NC, 1625-1632, 1992.

* cited by examiner

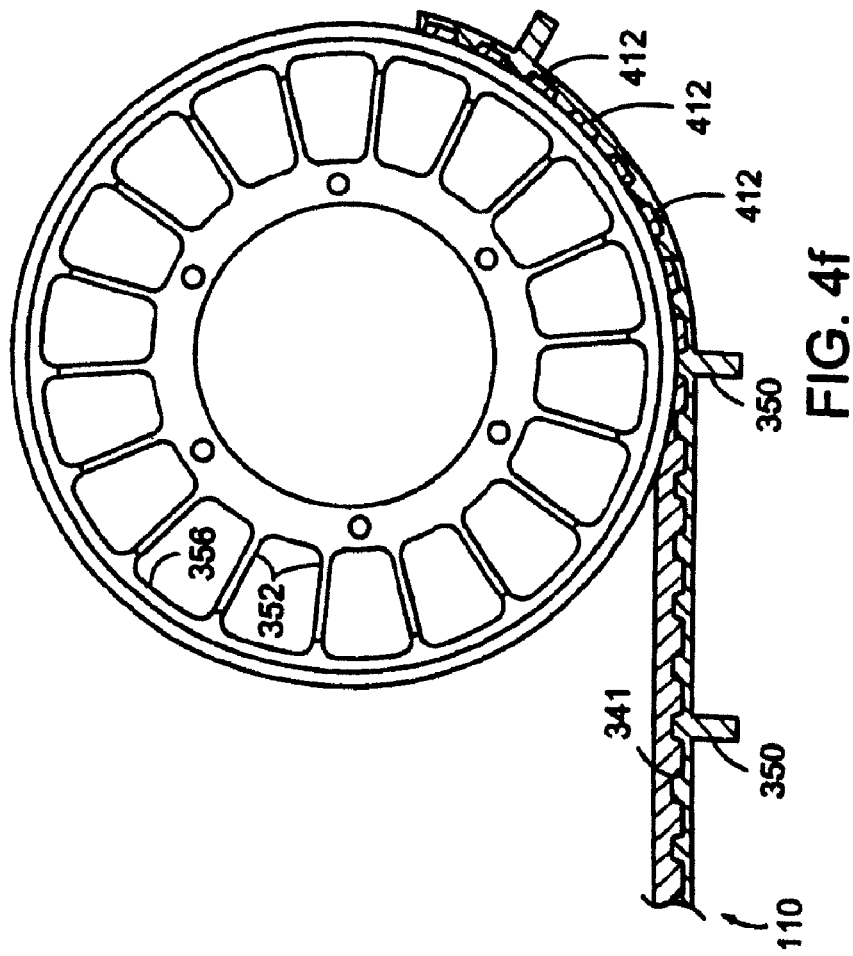
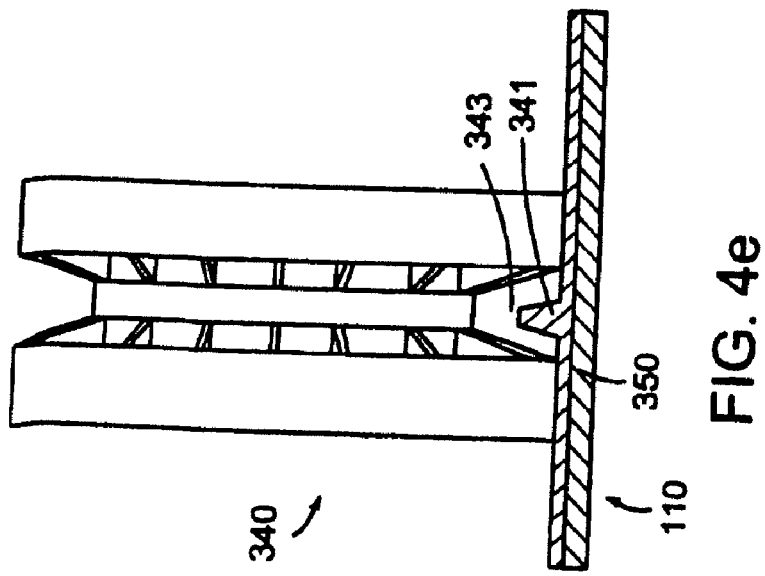
FIG. 4f
FIG. 4e

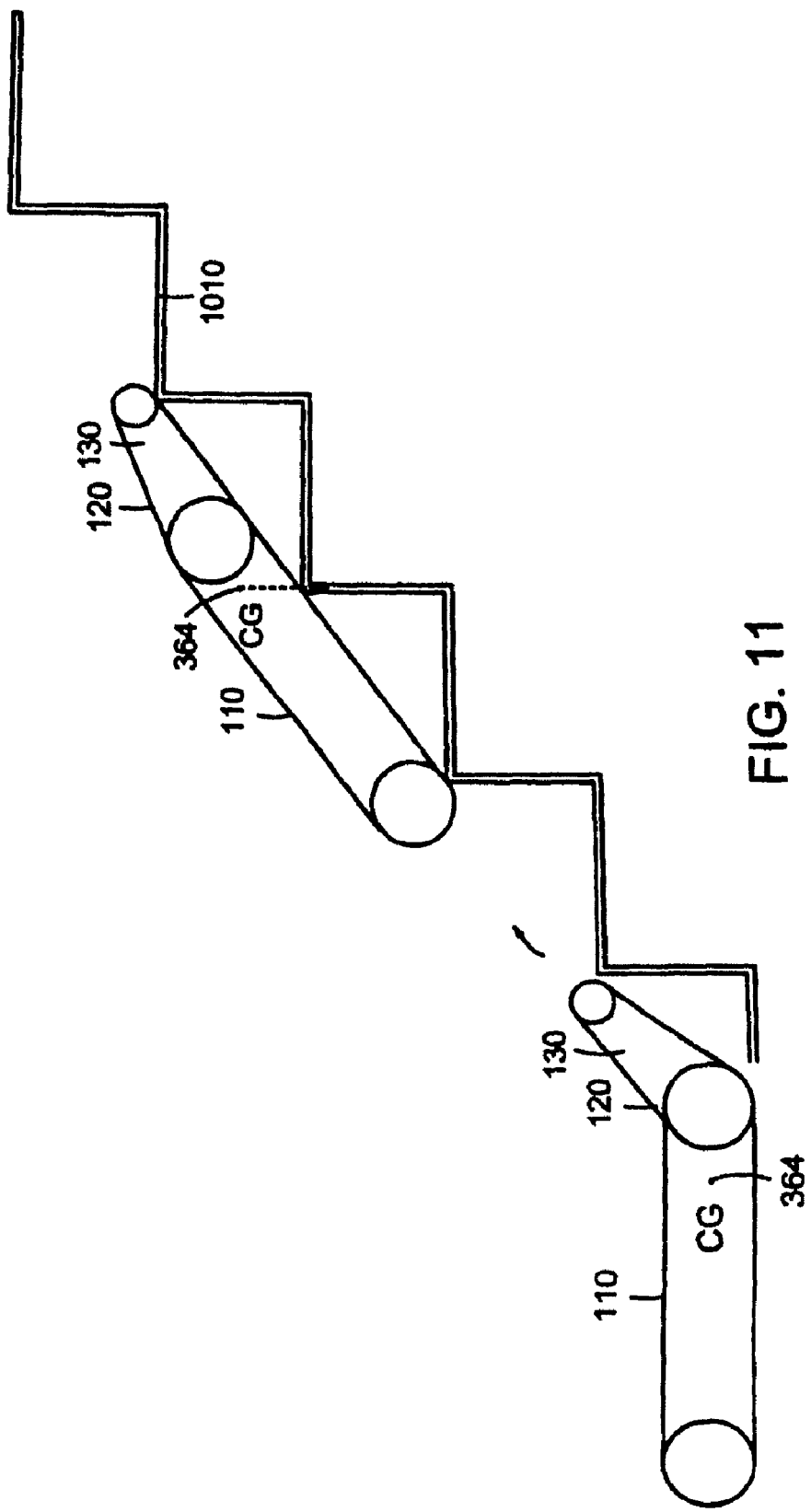

ROBOTIC PLATFORM

CROSS REFERENCE TO RELATED APPLICATIONS

This U.S. patent application is a continuation of and claims priority under 35 U.S.C. §120 from U.S. patent application Ser. No. 10/745,941, filed on Dec. 24, 2003, which is a divisional of U.S. patent application Ser. No. 10/202,376, filed on Jul. 24, 2002, which is a divisional of U.S. patent application Ser. No. 09/888,760, filed on Jun. 25, 2001, which is a divisional of U.S. patent application Ser. No. 09/237,570, filed on Jan. 26, 1999, which claims priority under 35 U.S.C. §119(e) to U.S. Provisional Application 60/096,141, filed Aug. 11, 1998, and U.S. Provisional Application 60/079,701, filed Mar. 27, 1998. The disclosures of these prior applications are considered part of the disclosure of this application and are hereby incorporated herein by reference in their entireties.

STATEMENT AS TO FEDERALLY SPONSORED RESEARCH

This invention was made in part with Government support under contract DAAL01-97-C-0157 awarded by the Army Research Laboratory of the Department of the Army. The Government may have certain rights in the invention.

BACKGROUND OF THE INVENTION

The invention relates to a robotically controlled mobility platform.

Robots are useful in a variety of civilian, military, and law enforcement applications. For instance, a robotically controlled mobility platform inspect or search buildings with structural damage caused by earthquakes, floods, or hurricanes, or inspect buildings or outdoor sites contaminated with radiation, biological agents such as viruses or bacteria, or chemical spills. The platform can carry appropriate sensor systems for its inspection or search tasks. Military applications include operations that are deemed too dangerous for soldiers. For instance, the robot can be used to leverage the effectiveness of a human "pointman." Law enforcement applications include reconnaissance, surveillance, bomb disposal and security patrols.

The mobility approaches that have been used in prior robotic platforms exhibit various shortcomings, many of which are addressed by the present invention.

SUMMARY OF THE INVENTION

In one aspect, in general, the invention is an articulated tracked vehicle. The vehicle has a main section which includes a main frame and a forward section. The main frame has two sides and a front end, and includes a pair of parallel main tracks. Each main track includes a flexible continuous belt coupled to a corresponding side of the main frame. The forward section includes an elongated arm having a proximal end and a distal end. The proximal end of the arm is pivotally coupled to the main frame near the forward end of the main frame about a transverse axis that is generally perpendicular to the sides of the main frame.

Alternative embodiments include one or more of the following features:

The arm is sufficiently long to allow the forward section to extend below the main section in at least some degrees of rotation of the arm, and the arm is shorter than the length of the main section.

The center of mass of the main section is located forward of the rearmost point reached by the distal end of the arm in its pivoting about the transverse axis.

The main section is contained within the volume defined by the main tracks and is symmetrical about a horizontal plane, thereby allowing inverted operation of the robot.

The vehicle is dimensioned for climbing a set of stairs. At a first adjusted angle between the main section and the forward section, the forward section rises more than the rise of the bottom-most of the set of stairs. At a second adjusted angle between the main section and the forward section, the length spanned by the combination of the main section and the forward section being greater than the diagonal span of two successive stairs. The center of gravity of the vehicle is located in a position so that the vehicle remains statically stable as it climbs the stairs at the second adjusted angle.

The forward section includes a second arm, also pivotally coupled to the main frame near its forward end. For instance, the arms are coupled to the main frame such that they rotate outside the main tracks. The two arms can be rigidly coupled and rotated together by the articulator motor. The articulator motor provides sufficient torque between the main frame and the arms to raise the rear end of the main section thereby supporting the vehicle on the front section. Continuous rotation of the arms can provide forward locomotion of the vehicle. A harmonic drive can be coupled between the articulator motor and the two arm. The harmonic drive provides a torque to the two arms greater than the torque provided to it by the articulator motor. A clutch can be coupled between the articulator motor and the two arms. The clutch allows rotation of the arms without rotation of the motor if the torque between the arms and the main section exceeds a limit. A pair of flexible forward tracks can be coupled to the two arms.

A pair of drive pulleys for supporting and driving each of the main and forward tracks are included, one on each side of the vehicle. The drive pulleys are coaxial with the transverse axis of rotation of the arms, and are joined so that they rotate together. The vehicle can include a pair of drive motors, one coupled to both the main and forward drive pulleys on a corresponding side of the vehicle.

On each side of the main frame, two compliant pulleys are coupled between one of the main tracks and the main frame, and multiple compliant track supports are coupled between the tracks and the side plates. Each pulley includes a compliant outer rim, a hub, and multiple compliant spoke segments coupled between the rim and the hub.

Multiple compliant longitudinal track supports coupled between the main frame and the continuous belts. Each longitudinal track support has a series of open slots forming a series of rib sections between the upper and lower edges of the support.

The pulleys and main frame are recessed within the volumes defined by the tracks.

Each track includes a flexible continuous belt and a series of compliant cleats attached transversely on the outside of the belt.

The main tracks each include a longitudinal rib coupled to the inside surface of the belt, and each of the pulleys includes a channel around its circumference which accepts the longitudinal rib. The channels are dimensioned larger than the rib thereby allowing debris to be caught between a pulley and a tracks without dislodging the track from the pulley.

In another aspect, in general, the invention is a method for operating an articulated tracked vehicle having a main tracked chassis and a pivoting forward arm for the vehicle to climb a set of stairs. The method includes pivoting the arm to raise the arm higher than the rise of the bottom-most stair of the set of stairs, then approaching the first stair until the arm contacts the first stair. The method further includes driving the main tracks until the main tracks contacts the first stair, and then pivoting the arm to extend the tracked base of the vehicle. The method then includes driving the main tracks to ascend the set of stairs.

In another aspect, in general, the invention is a method for inverting an articulated tracked vehicle which has a main tracked chassis and a pivoting arm. The method includes supporting the vehicle on the main tracks in a first vertical orientation, supporting the vehicle on the pivoting arm, and then pivoting the arm to raise the main chassis above the supporting surface. Further pivoting of the arm passes the main chassis past a stable point. This results in the vehicle being supported on the main tracks in a second vertical orientation, the second vertical orientation being inverted with respect to the first orientation.

Aspects of the invention include one or more of the following advantages. One advantage is immediate recovery from tumbles in which the vehicle lands on its "back." The vehicle can operate with either side up and therefore does not necessarily require righting. Also, if one vertical orientation is preferable over another, for example, due to placement of sensors, the robot can invert itself to attain a preferred orientation.

Another advantage is impact resistance. Impact resistance allows the robot to operate even after collisions, falls, or tumbles. Furthermore, impact resistance allows deploying the robot in a variety of ways including tossing it from a height, such as from a window or from a helicopter.

The housing of components within the track volume has the advantage that the robot's components are less likely to be damaged in a fall or tumble. Recessing the side plates of the robot frame within the track volume also reduces the likelihood of impacting the frame in such a tumble or fall.

The robot's forward center of gravity has the advantage that it aids stair climbing and climbing of steep inclines. Also, a center of gravity within the extent of the forward articulated section allows the robot to perform a self righting operation and to operate in an upright posture by supporting the platform solely on the forward section.

The robot's articulated body, including continuously rotatable arms, has the advantage that the robot can be driven using a "paddling" action of the arms. This mode of driving the vehicle is useful, for instance, when the tracks have inadequate traction, for example due to an obstruction supporting the center of the frame.

Compliant idler and drive pulleys provide robustness to debris that may be caught between the tracks and the pulleys. Also, raised segments on the tracks mating with corresponding channels in the outside rims of the idler and drive pulleys reduces the possibility of "throwing" a track. Loose mating of the raised segments and the channels also permits debris being caught between the pulleys and the track without throwing a track or stalling a drive motor.

Other features and advantages of the invention will be apparent from the following detailed description, and from the claims.

BRIEF DESCRIPTION OF THE DRAWINGS

FIGS. 4a-g show idler and drive pulleys;

FIG. 11 is a schematic view of a stair climbing maneuver;

DETAILED DESCRIPTION

Figure 1:
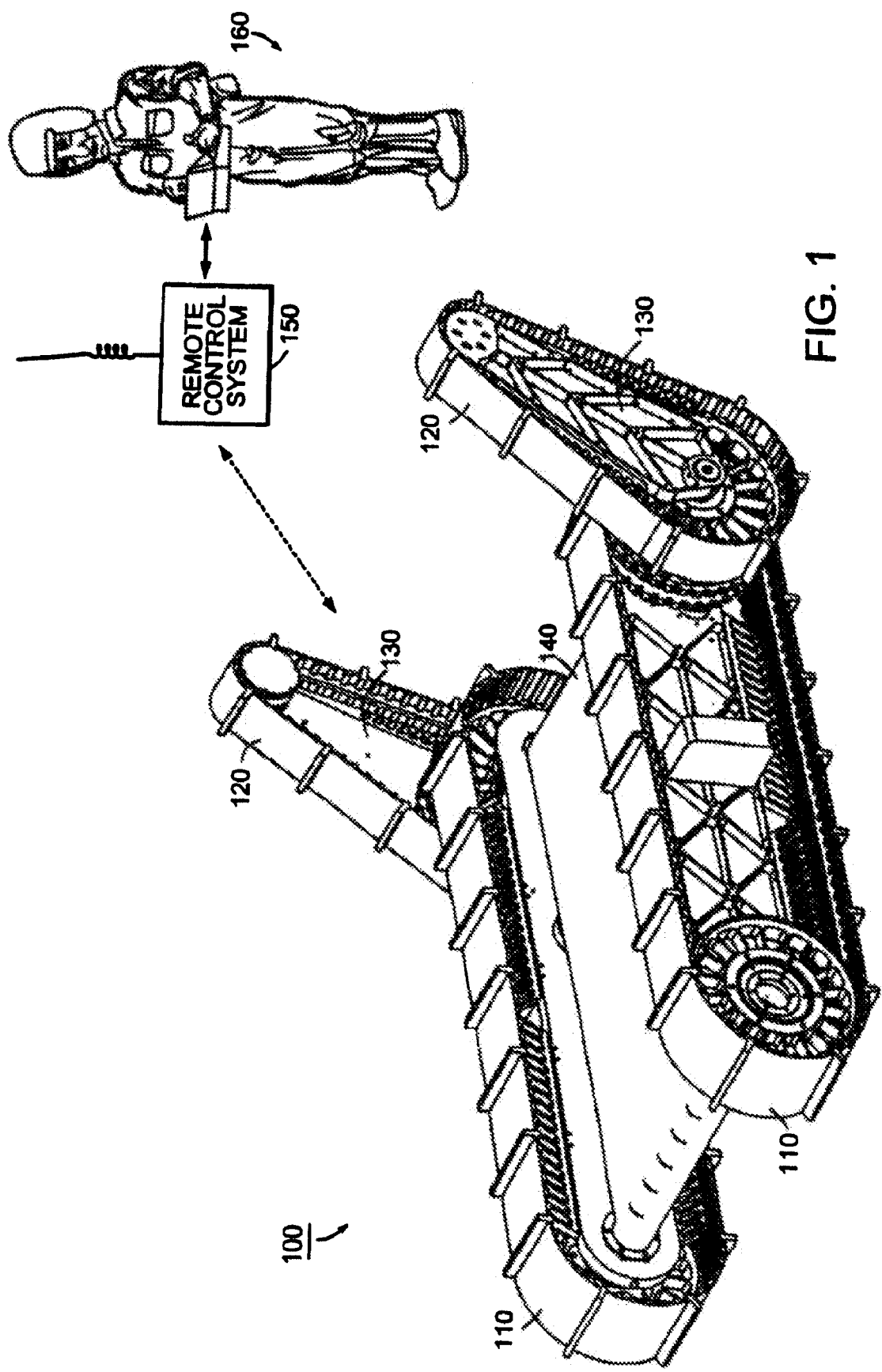
FIG. 1 illustrates teleoperator control of a robot.

Referring to FIG. 1, a version of the system includes a robot 100, and a remote control system 150. Remote control system 150 allows an operator 160 to control robot 100 from a distance. The operator can select different levels of human control over the robot, ranging from a teleoperation mode, in which the operator directly controls the motors and actuators on the robot, to autonomous operation, in which the operator passes higher-level command to the robot. In partially autonomous operation, robot 100 can perform tasks such as following a wall, recovering from being stuck in an opening or due to high centering on an obstruction, evading a moving object, or seeking light.

Robot 100 moves around its environment on a pair of parallel main tracks 110 and a pair of tapered forward tracks 120. Main tracks 110 are mounted on a main body 140 of the robot. Robot 100 is articulated. In particular, forward tracks 120 are mounted on a pair of forward arms 130, which are pivotally attached to the main body 140 and can be positioned at any angle to main body 140. Robot 100 is designed to move about in a variety of environments, including an urban environment of buildings (including staircases), streets, underground tunnels, and building ruble, as well as in vegetation, such as through grass and around trees. Robot 100 has a variety of features which provide robust operation in these environments, including impact resistance, tolerance of debris entrainment, and invertible operability. The robot's design is symmetrical about a horizontal plane so that it looks the same upside down and can operate identically in either orientation. Therefore, the robot can recover quickly from a tumble or fall in which it is inverted.

Figure 2:
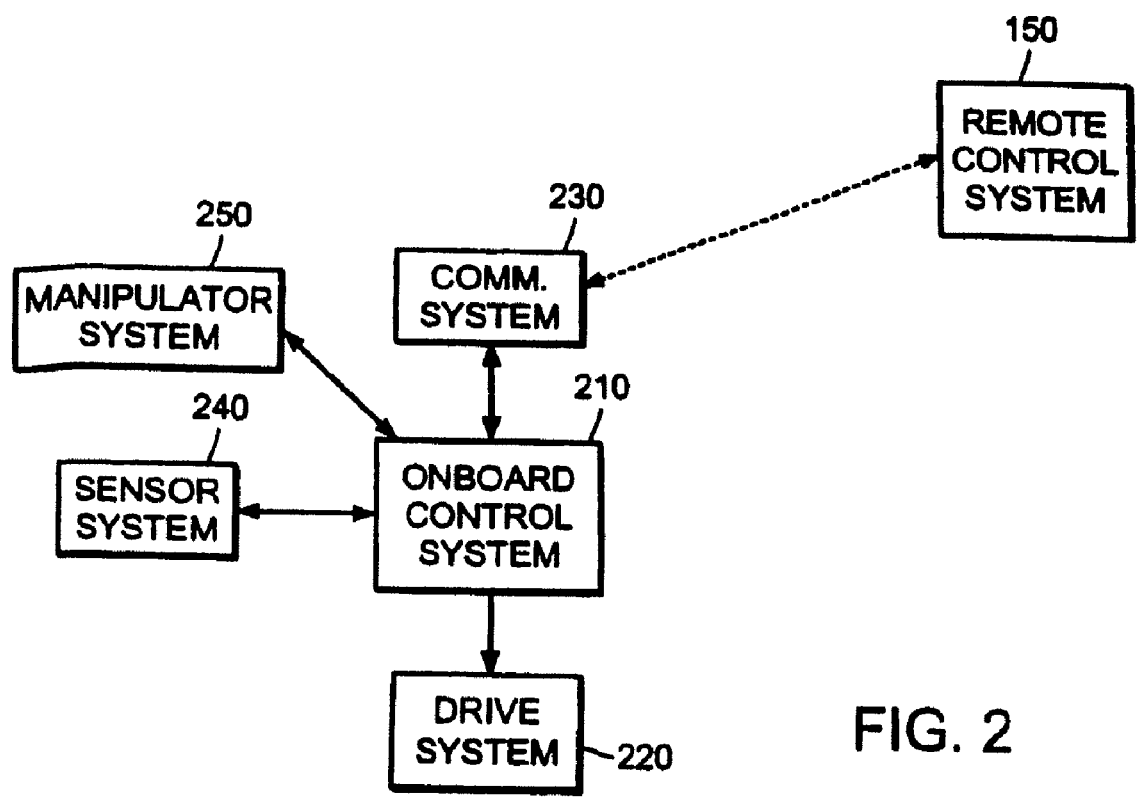
FIG. 2 is a functional block diagram of system components of a robot.

Referring to FIG. 2, robot 100 includes an onboard control system 210, which includes one or more computer processors and associated memory systems. Onboard control system 210 is coupled to a drive system 220, which includes motors that drive main and forward tracks 110 and 120 and drive arms 130. Onboard control system 210 is coupled to a communication system 230, which includes, for example, a radio for exchanging control and feedback information with remote control system 150. Robot 100 can optionally carry a sensor system 240, including, for example, a camera, to provide feedback to operator 160. Sensor system 240 also provides input to onboard control system 210, such as the angle between arms 130 and the main body. These inputs are used during fully or partially autonomous operation. Robot 100 can also optionally carry a manipulator system 250, including, for example, a door opening device, for use under remote or autonomous control.

Figure 3A:
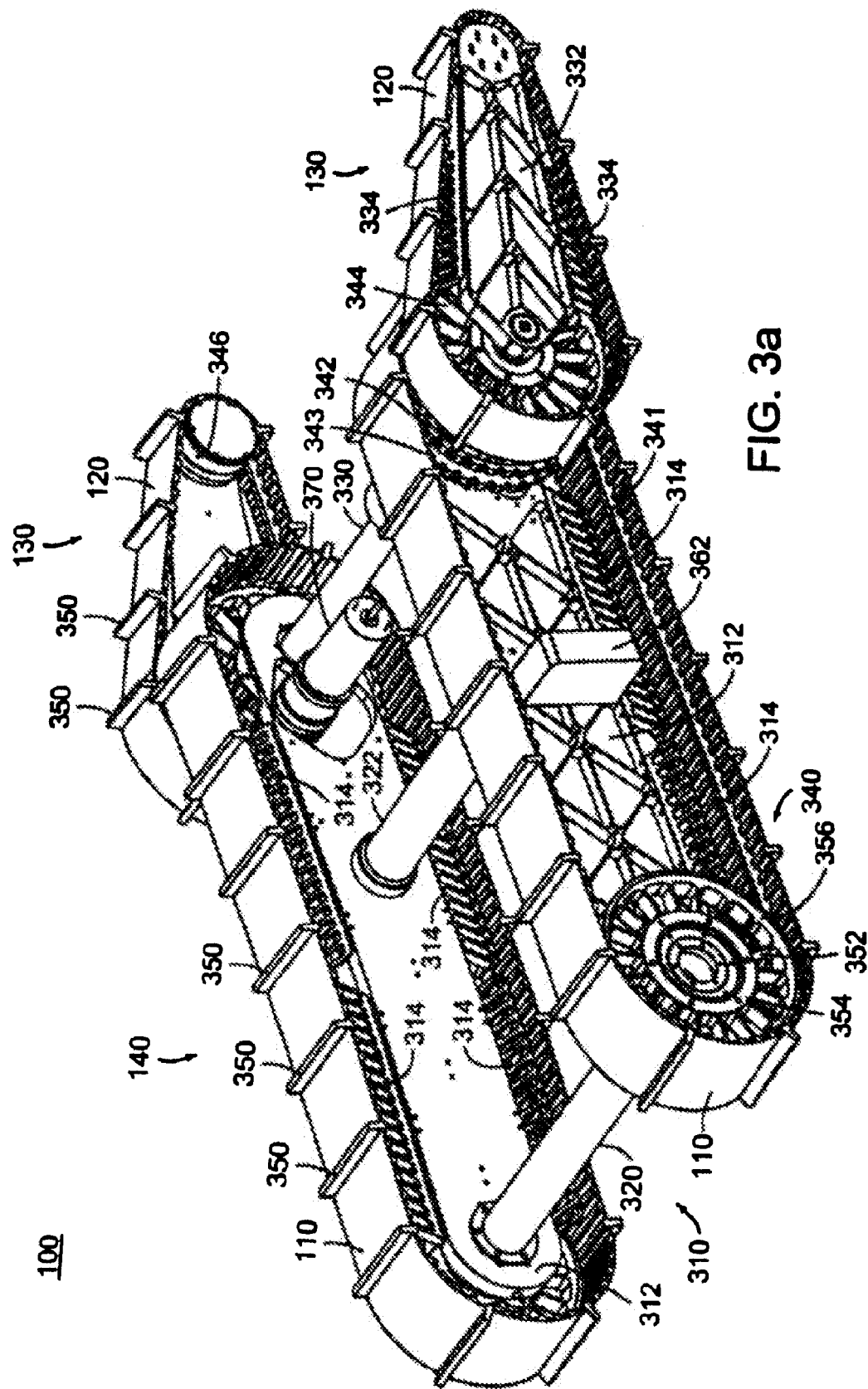
FIGS. 3a-c are a perspective, side, and top view, respectively, of a robot.
Figure 3B:
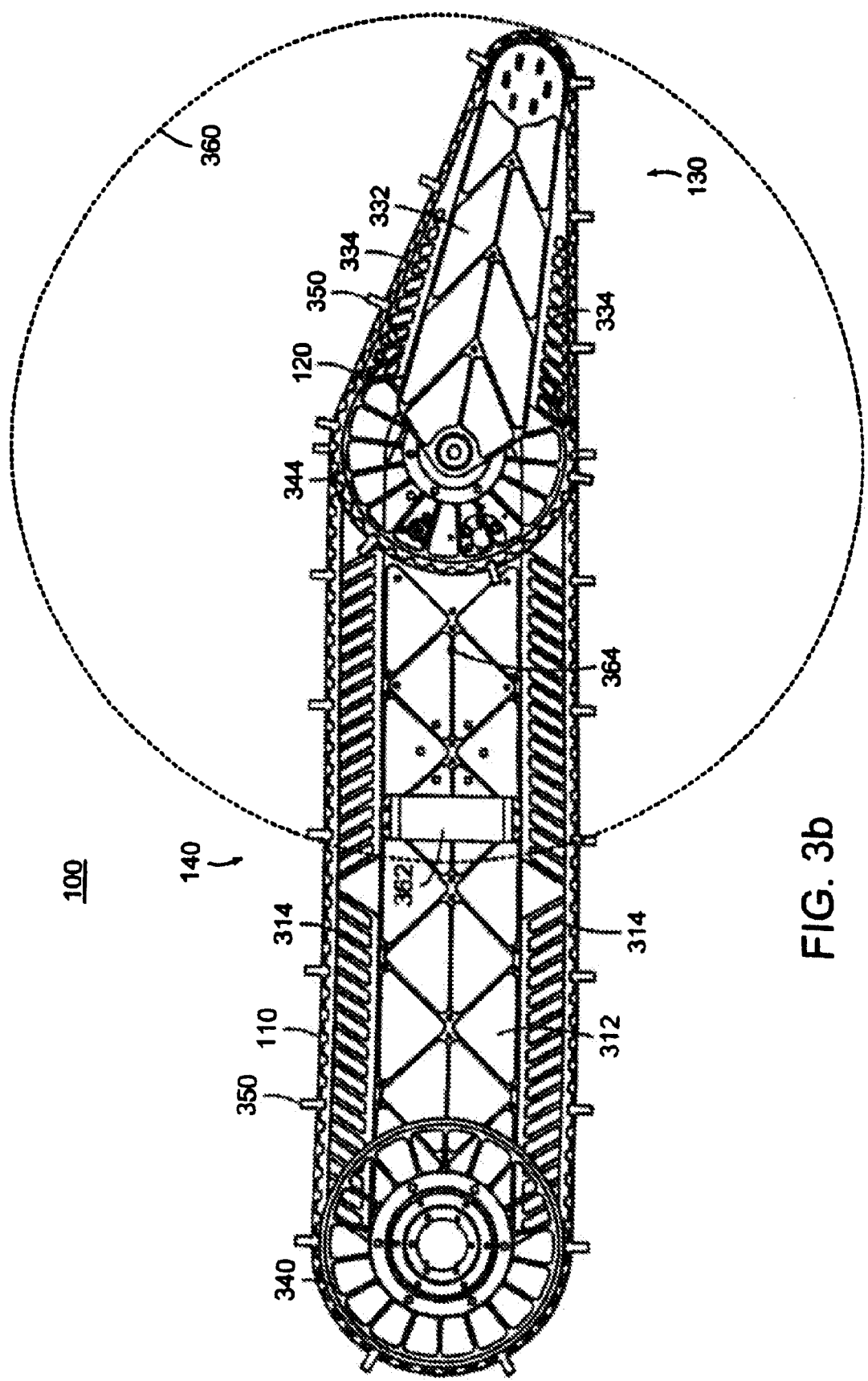
Figure 3C:
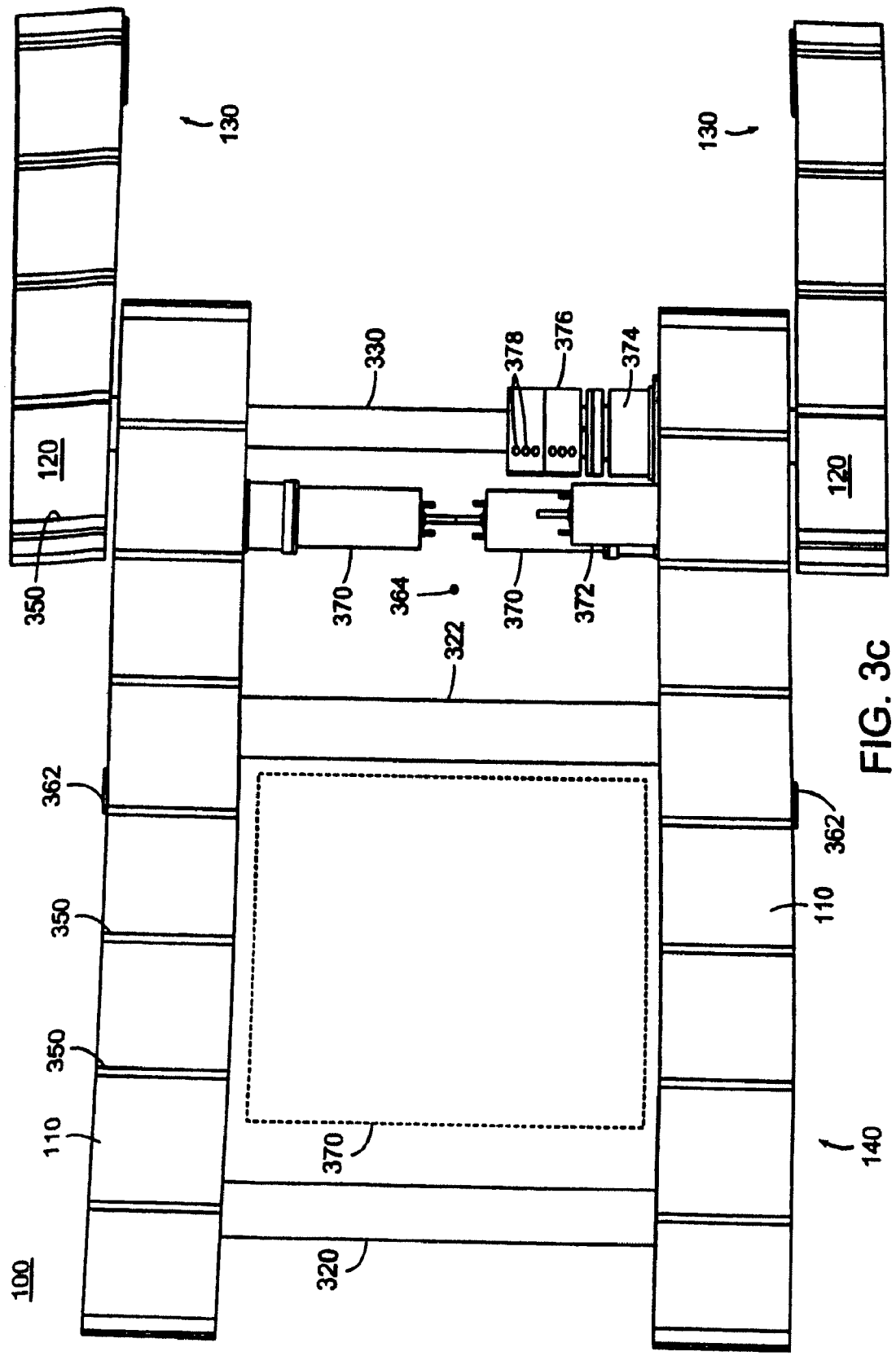

FIGS. 3a-c show robot 100 in a fully extended configuration in which forward arms 130 extend beyond the front of main body 140. The combination of forward tracks 120 and main tracks 110 and provide an extended length base. Main body 140 includes a vertically symmetrical rigid frame 310 which includes parallel vertical side plates 312. Side plates 312 are rigidly coupled by tubes 320 and 322 and an articulator shaft 330. The rigid components are designed for strength and low weight and are made from a material such as 7075-T6 aluminum. Alternative versions of the robot can use other materials, such as other lightweight metals, polymers, or composite materials.

Figure 4A:
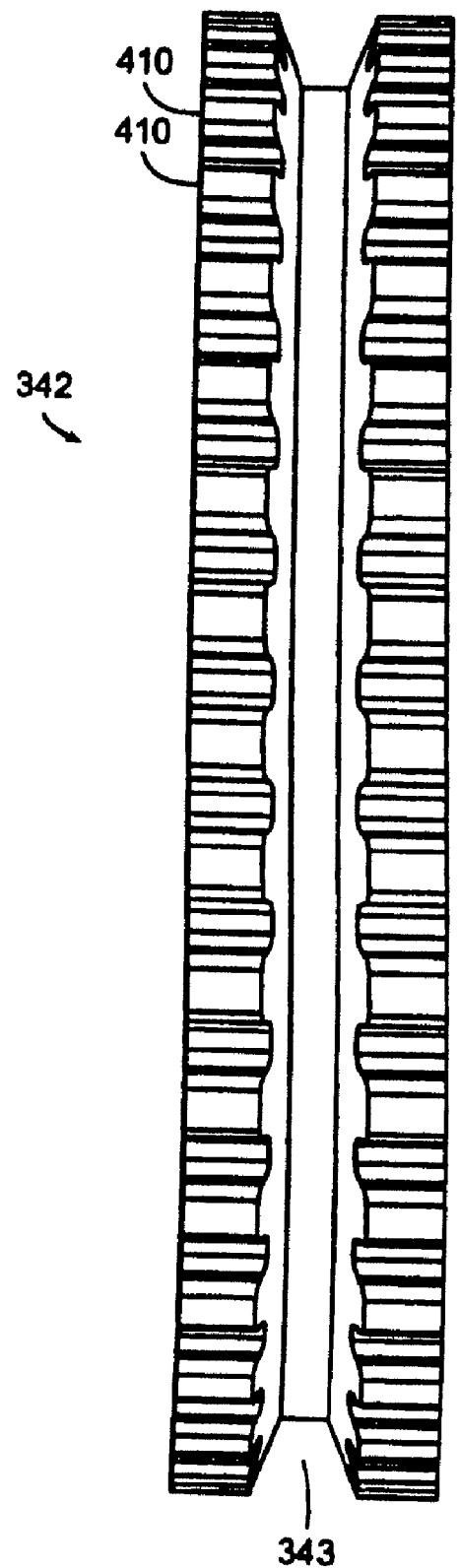
Figure 4B:
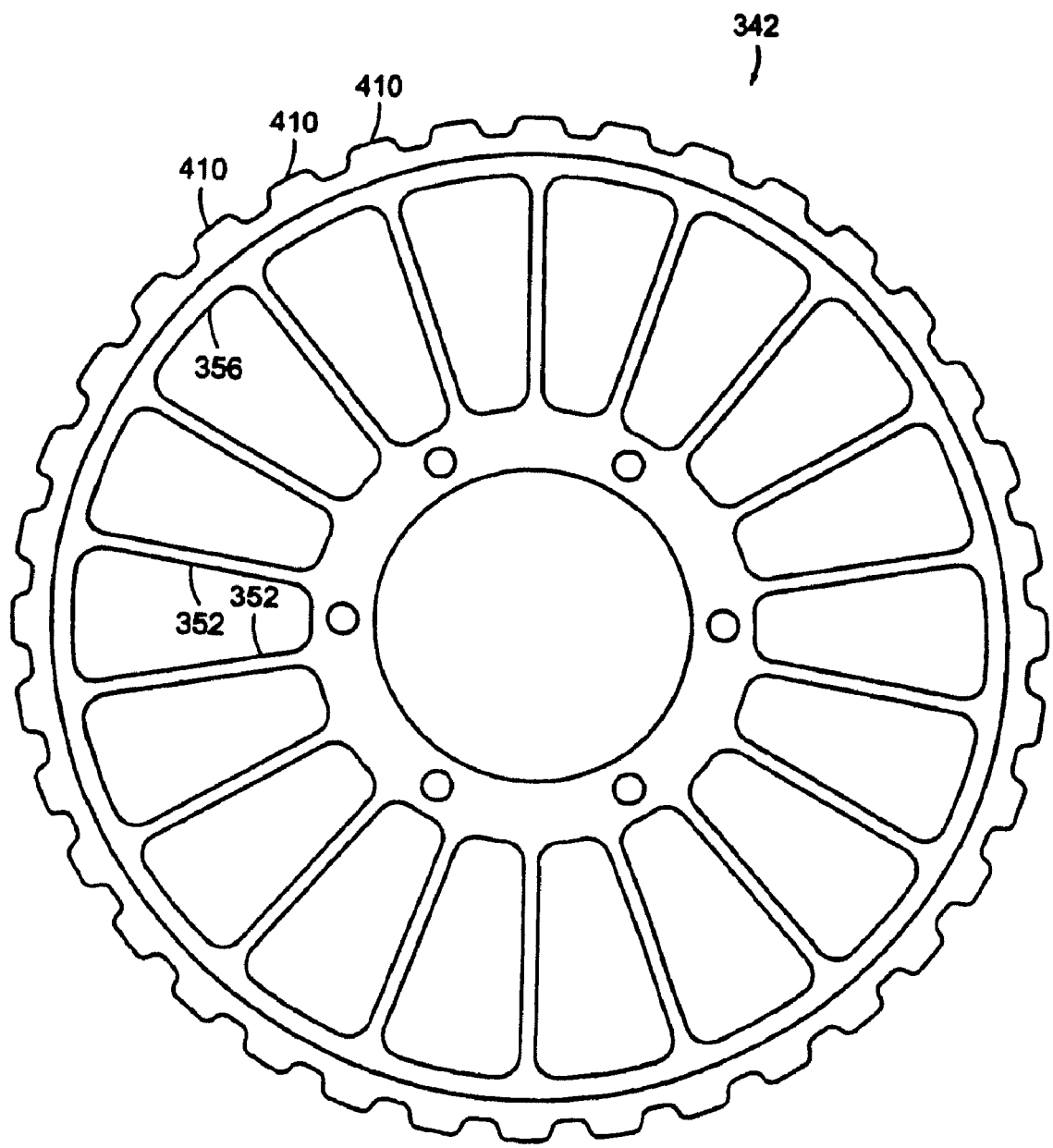
Figure 4C:
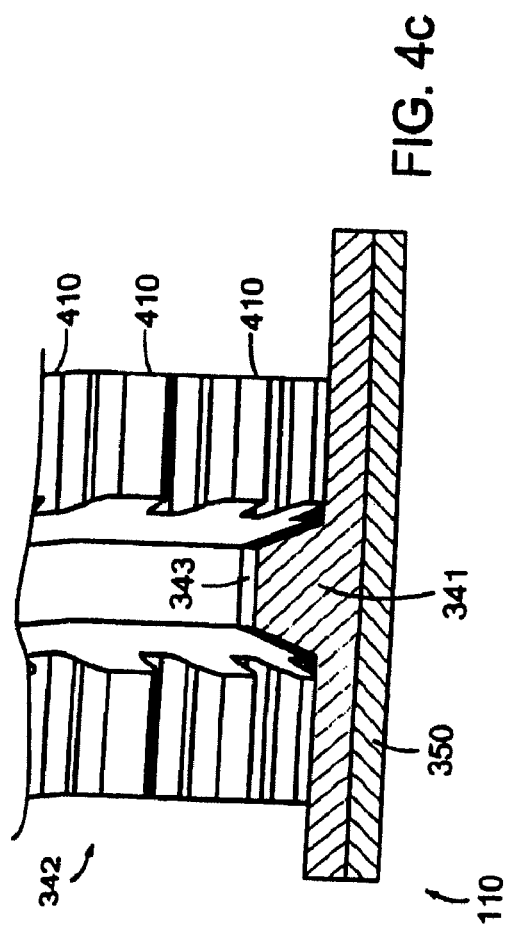
Figure 4D:
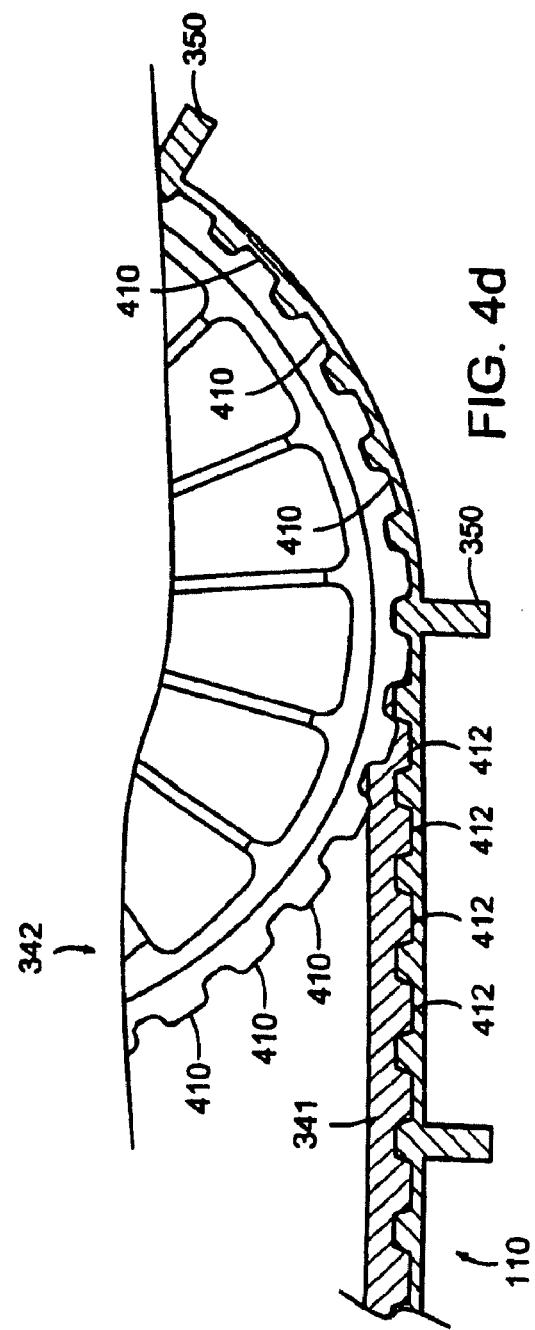

Referring to FIGS. 4a-f, main tracks 110 and front tracks 120 include compliant belts made of a solid polyurethane or a similar flexible material. The belts are highly abrasion resistant and have high strength and minimal stretch due to internal steel or fiber cording. Referring to FIGS. 4a-d, each main track 100 is driven by a toothed main drive pulley 342. Teeth 410 in each main drive pulley 342 mate with grooves 412 on the inside surface of the corresponding main track 110. Referring to FIGS. 4e-f, a smooth surfaced main idler pulley 340 supports each main track 110 at the rear of the robot. Both main drive pulleys 342 and main idler pulleys 340 have V-shaped channels 343 around their circumference. These grooves loosely mate with an integral offset V-shaped rib 341 on the inside of each main track 110. The main and front tracks have soft elastomer cleats 350 spaced along their length. In alternative embodiments, main and front tracks are smooth high-friction tracks.

Alternative versions of the robot can use other types of tracks, such as tracks made up of discrete elements. However, debris may be caught between elements and such tracks are generally heavier than flexible belts. Other flexible materials can also be used for continuous belt tracks. Referring back to FIGS. 3a-c, each front track 120 is narrower but otherwise similar to main tracks 110, having grooves and a V-shaped segment on the inside surface, and soft cleats 350 attached to the outside surface. A front drive pulley 344 drives each front track 120. Each front drive pulley 344 is toothed and has a central V-shaped channel that loosely mates with the V-shaped rib on the inside of the corresponding front track 120. On each side, front drive pulley 344 is coaxial with main drive pulley 342, and both drive pulleys on a particular side turn in unison on a common axle. A smaller smooth surfaced front idler pulley 346, which also has a V-shaped channel, supports each front track 120 at the extreme end of the corresponding arm 130.

Referring again to FIGS. 4a-f, each of the drive and idler pulleys 340, 342, 344, 346 are compliant (75 D durometer) and are made of a polyurethane or a similar material. Although flexible, the design and material stiffness provides resistance to lateral loading. Each pulley has a series of radial spokes 352 around a central hub 354. Spokes 352 support a thin outer rim section 356. The combination of spokes 352 and thin outer ring section 356 provide a compliant support for the track that can deform if debris is caught between outer ring section 356 and the track. This allows debris to be caught without necessarily stalling a drive motor or throwing a track.

Figure 4G:
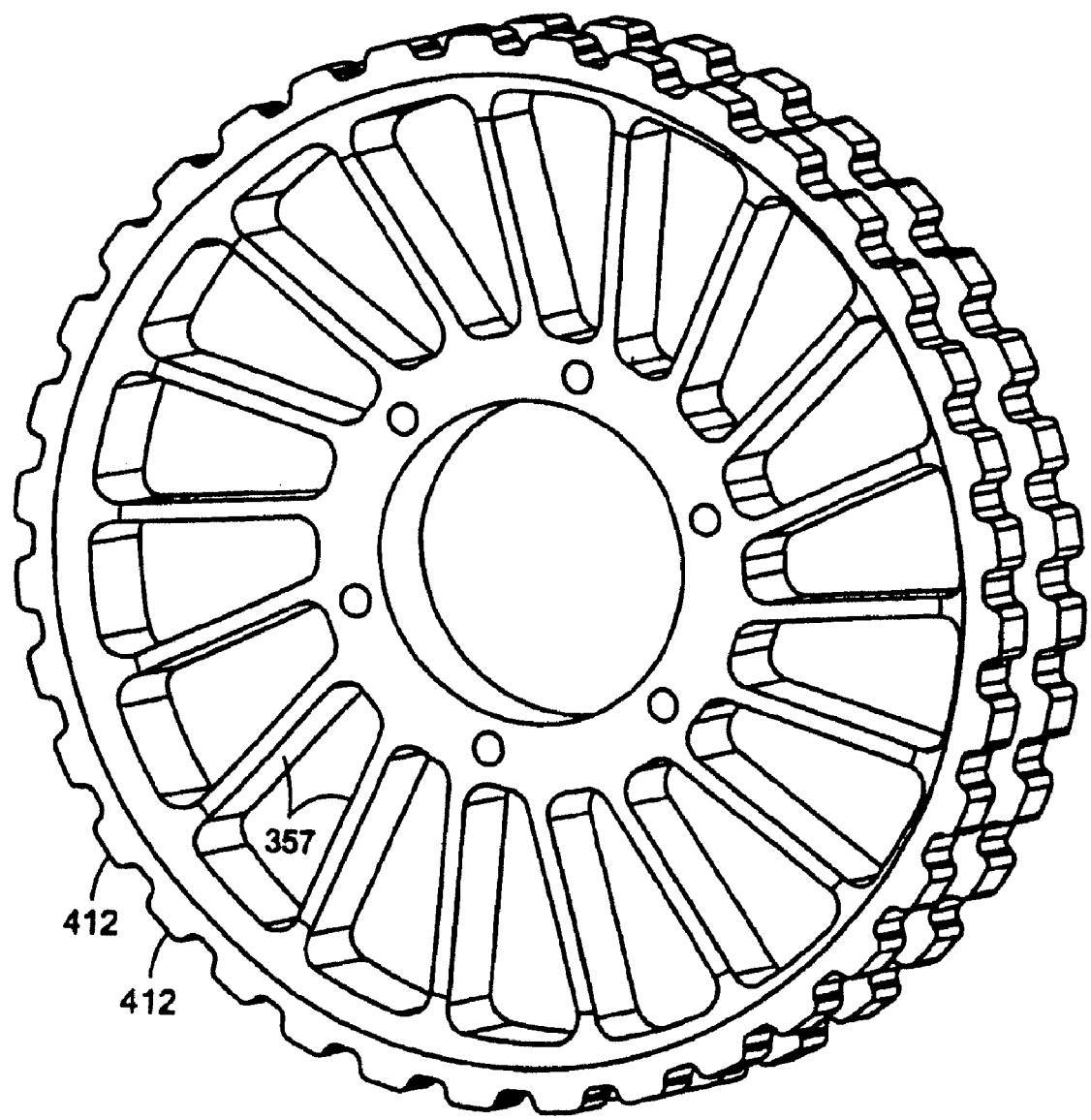

Referring to FIG. 4g, an alternative version of the idler and drive pulleys also has a spoke pattern, but the spokes are "angled" rather than being radial. Angled spokes 357 have less tendency to buckle on direct impact. Alternative materials can also be used, providing more or less compliance, depending on the impact resistance and payload capacity requirements for the robot.

Figure 5:
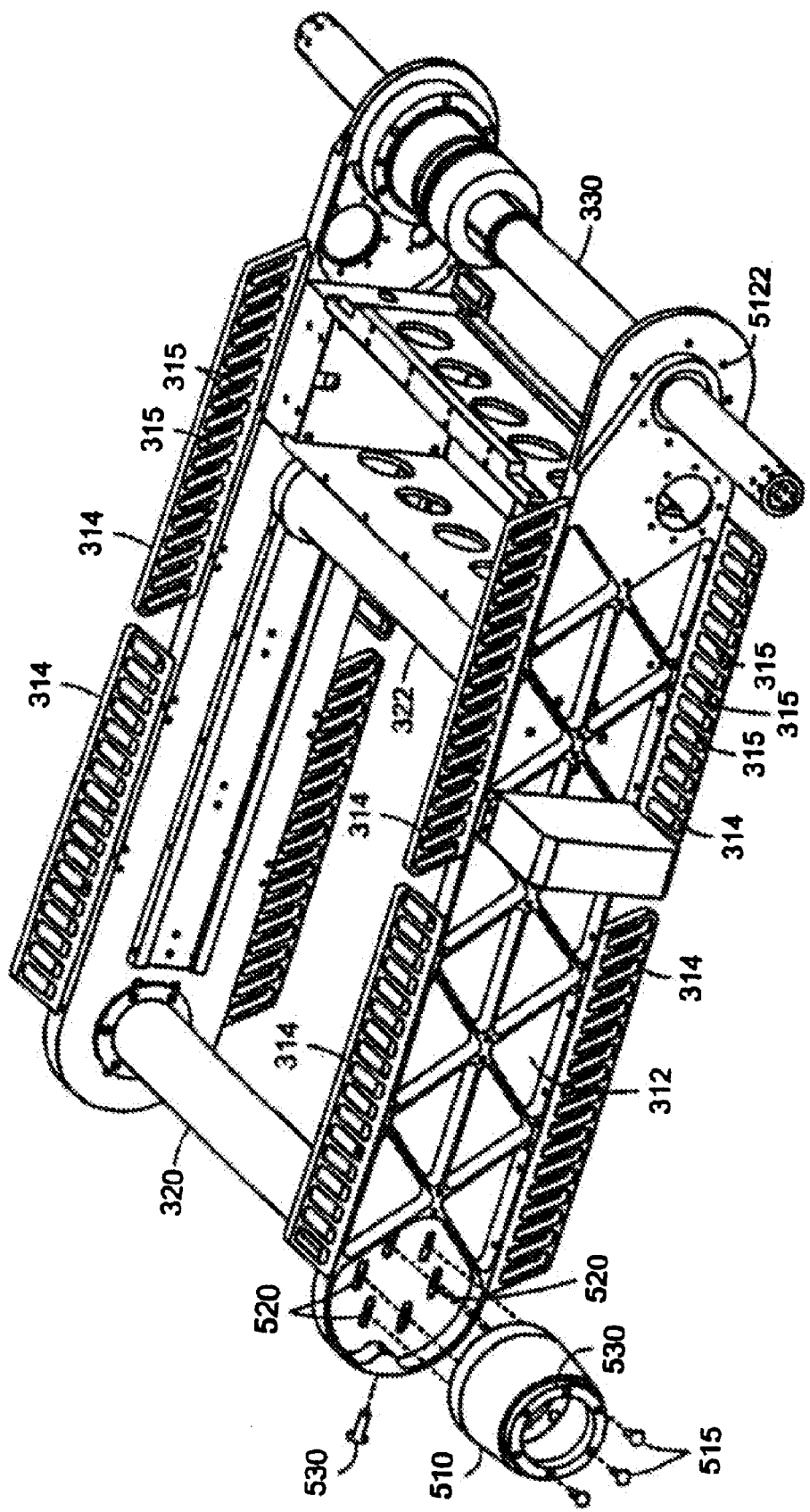
FIG. 5 is a perspective view of a robot frame.

Referring to FIG. 5, on each side, between drive pulley 342 and idler pulley 340. Compliant main track supports 314 provide support for main track 110. Track supports 314 are made of the same material as the drive and idler pulleys. Main track supports 314 are attached by screws to the top and bottom surfaces of side plates 312. Each main track support 314 has a series of angled slots. The slots in the track supports are formed such that a series of angled ribs 315 join the top and bottom edges of the tract support. These ribs bend when the top and bottom edges of a track support are forced together, thereby providing compliant support for each track.

Referring back to FIGS. 3a-b, front tracks 120 are supported by arm side plates 332 using front track supports 334. Front track supports 334 are wedge-shaped and each has a series of angled slots similar to those in main track supports 314. The arm side plates 332 on each side of the robot are rigidly coupled to one another through articulator shaft 330, and therefore move together.

Referring to FIG. 3b, front arms 130 can be continuously rotated around articulator axle 330 as indicated by circle 360. On each side, an arm support 362 is attached to the side plate 312. When arms 130 are rotated to a "stowed" position next to the side plates 312, the front idler pulleys 346 have a clearance fit next to the corresponding arm supports 362. Both arm supports 362 and arms 130 have polymer pieces, such as Derlin, on the mating surfaces.

The robot's mobility system is powered by three separate electrical motors. Referring to FIG. 3c, on each side of the robot a respective identical drive motor 370 is coupled to main and front drive pulleys 342 and 344 by a chain and sprocket mechanism (not shown).

Referring still to FIG. 3c, an articulator drive motor 372 is used to control the angle between arms 130 and the main body. Articulator drive motor 372 is coupled to the input of a harmonic drive 374 which provides a gear reduction to articulator axle 330. Harmonic drive 374 has a central opening through which articulator axle 330 passes. The output of harmonic drive 374 is coupled to a slip clutch 376 which provides output torque to articulator axle 330. Slip clutch screws 378 are tightened to provide adequate transfer of torque to rotate arms 130 while allowing the articulator axle to slip in the event that a large torque is applied to the arms. Articulator axle 330 passes through a central opening in drive pulleys 342 and 344 and is attached to arm side plates 332.

In this version of the robot, drive motors 370 and articulator motor 372 are 90 watt DC brushed motors. In other versions of the robot, brushless motors can be used. Drive motors 370 are geared down 32.7:1 to the drive pulleys. Harmonic drive 374 provides a 427:1 gear reduction between articulator drive motor 372 and articulator axle 330, thereby providing a maximum torque of approximately 127 N☐m to arms 130. Slip clutch 376 prevents overloading of harmonic drive 374 if the torque exceeds the maximum torque that can be provided by articulator drive motor 372, for instance due to an impact on the arms.

Due to the placement of the motor and drive components, the center of mass of robot 100 is well forward. In particular, referring to FIG. 3b, center of mass 364 falls within the circle 360 of rotation of arms 130. This location enables or aids certain maneuvers such as stair climbing and self righting, as are described below.

Referring to FIG. 3c, robot 100 includes a payload volume 370 between side plates 312, and between structural tubes 320 and 322. The main body, including the payload volume, and the drive motors and drives, is housed in a thin, impact resistance, polycarbonate shell (not shown). The main body is totally within the volume defined by the main tracks, and furthermore is sufficiently thin to provide ground clearance in both upright and inverted orientations of the robot.

As an alternative to payload being contained within payload volume 370, payloads can be placed on the top of the robot, preferably near the center of mass to aid operations such as stair climbing. Although invertible operation may not be possible in this case, larger payloads can be carried in this way.

Referring again to FIG. 5, each of the idler pulleys are attached to side plates 312 by a pulley holder 510 which attaches to the side plate using a series of radially positioned screws 515. Screws 515 pass through slots 520 in the side plates. This allows each pulley holder to slide in a back and forth direction. A tensioning screw 530 passes through a hole in side plate 312 and mates with threads in pulley holder 510. Tensioning screw 530 is used to adjust the position of the pulley holder prior to tightening the screws. Pulley holders 510 include ball bearings 530 which support the idler pulleys. A similar slot and tensioning screw arrangement is used on the front tracks (not shown in FIG. 5). The front and main drive pulleys are attached to side plates 314 using similar pulley holders which mate with holes 522 (rather than slots) in the side plates 312. The tensioning mechanism allows easy replacement of the tracks, for example, to change a cleat design or material to better match the environment the robot must traverse.

Rather than using ball bearings 530 to support the drive and idler pulleys, alternative versions of the robot can use small diameter polymer bearings. Although polymer bearings have somewhat greater friction, they cost less than ball bearings and reduce maintenance due to dirt contamination. Polymer bearings are also more shock resistant than ball bearings.

This version of robot 100 is sized to be portable, and is approximately 62.5 cm (24.6") long (with arms stowed) by 50.8 cm (20") wide by 16.8 cm (6.3") high, and weighs 10.5 kg (23 lbs.) The robot can be carried by a person on his or her back, for example, attached to a special frame or stowed in a backpack. Structural tube 320 can also serve as a carrying handle.

Main tracks 110 are 7.6 cm wide (3") and front tracks 120 are 5.1 cm wide (2"). Cleats 350 extend 0.95 cm (0.4") from the outside surface of the tracks. Approximately half of the frontal area of the robot is tracked. Main tracks 110 are wide for maximum "grab" of the surface during normal high speed locomotion and are separated sufficiently for efficient skid steering. Front tracks 120 are as small as possible to be effective while minimizing the mass of arms 130. In alternative versions of the robot, the front tracks can be made even narrower since the articulation is designed for limited use in certain situations, such as stair climbing.

All the main and front drive and idler pulleys are 2.54 cm (1") wide, thereby minimizing the area that debris can be caught between the pulleys and the tracks, while still being able to deliver maximum power to the tracks.

Rigid frame 310 and payload volume provide a ground clearance of 4.1 cm (1.6") on either side. The robot can carry a payload of up to 10 kg (22 lbs.). If the payload is positioned over the center of mass, the robot can still perform operations such as stair climbing.

In operation, robot 100 is designed to maneuver at high speed in rough terrain. It may collide with objects and suffer tumbles and falls. For instance, the robot may tumble when descending stairs. Furthermore, the robot may be deployed by tossing it out of a helicopter. Therefore, the robot is designed to be as impact resistant as possible. Also, as the robot is completely invertible, it can immediately continue operation after it is inverted in a fall or collision.

Impact resistance is accomplished, in part, by surrounding much of the vehicle with compliant main and front tracks 110 and 120 with soft cleats 350. The tracks and cleats provide a first layer of impact protection. The tracks are supported by compliant idler and drive pulleys 340, 342, 344, and 346 and by compliant main and front track supports 314 and 334, which, working together, provide a second layer of impact protection.

Referring back to FIG. 3a, side plates 312 are recessed within the track volume, thereby reducing the likelihood that the frame will be directly impacted from the side in a tumble or a fall. Similarly, the main body and payload volume are recessed relative to the top and bottom of the main tracks, thereby reducing the likelihood that the main body will be impacted.

In the event of a tumble or a fall, arms 130 can be vulnerable to damage if they are extended away from the main body. For instance, a fall laterally onto the tip of an arm could damage it. However, arms 130 are, in general, used in situations where the possibility of a fall is small. In most operations, the robot will have the arms "stowed" at its sides. Arm supports 362 provide significant lateral support to the arms during impacts in the stowed position. To further prevent possible damage, when robot 100 detects that it is in free fall using its sensor system, it automatically assumes the stowed position without requiring operator intervention.

Robot 100 is designed to maneuver in dirt and debris. There is a possibility that such dirt and debris can be caught between the tracks and the drive and idler pulleys. The idler and drive pulleys are compliant and can tolerate material being caught between them and the tracks. The V-shaped ribs 341 (FIG. 4) on the inside surfaces of the tracks which mate with the V-shaped channels 343 on the pulleys are deep enough to prevent "throwing" a track. Also, the fit between the V-shaped channel and the V-shaped grooves is loose thereby allowing debris to be caught without necessarily dislodging the V-shaped segment. Furthermore, the idler pulleys do not have teeth, thereby further reducing the effect of debris entrainment by allowing debris to pass under the idler pulleys in the grooves of the tracks. Finally, the pulleys are narrow, thereby minimizing the places that debris can be caught.

Further debris resistance can be obtained in alternative versions of the robot using active debris removal approaches. For instance, a stiff brush positioned before each pulley can prevent debris from entering the pulleys. Compressed air jets can also be used in place of the brushes to remove debris on the tracks. Flexible or rigid skirts, placed at an angle in front of each of the pulleys, can also divert debris before it enters the pulley.

Referring to FIG. 3c, robot 100 is controlled using left and right drive motors 370 and articulator motor 372. Steering is accomplished using differential speed of the tracks on either side of the robot. The robot will, in principle, skid around its center of gravity 364 (shown in FIG. 3c) allowing complete turning with the extremes of the robot staying within a 100 cm (39.4") diameter circle.

In operation, robot 100 has several mobility modes including fully extended, stowed arms, inclined, upright, and "wheelie" modes. In addition, robot 100 can perform several maneuvers including self righting, stair climbing, and recovery from high centering.

A fully extended mode is shown in FIGS. 3a-c. In this mode, the longest possible "wheelbase" is achieved. This mode is useful, for instance, in a stair-climbing maneuver describe below.

Figure 6:
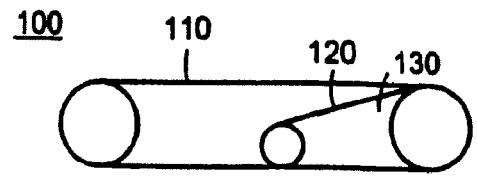
FIG. 6 is a schematic side view of the stowed position.

Referring to the schematic view of FIG. 6, the stowed arms mode is the most compact configuration of robot 100. Arms 130 are stowed next to the main track such that both main tracks 110 and forward tracks 120 provide traction. This configuration is used for high speed mobility and for traversing rough terrain. It is also the configuration that is used when robot 100 is launched by tossing or dropping it through a window or door or when the robot tumbles.

Figure 7A:
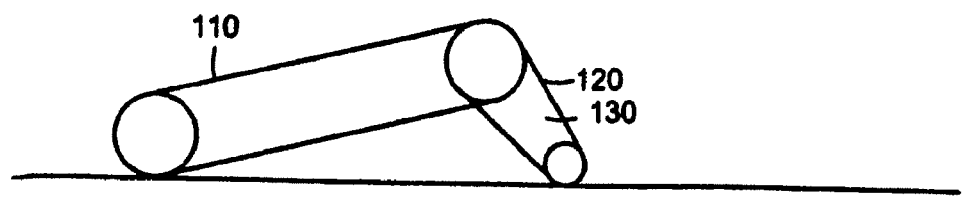
FIG. 7a is a schematic side view of the inclined position.

Referring to FIG. 7a, robot 100 can deploy arms 130 to raise the forward end of the main body in an inclined mobility mode. This posture is useful for increasing ground clearance to traverse rubble-strewn terrain and to increase the height of sensors on the platform, such as a CCD camera. Note that in the inclined mobility mode, the robot travels on four points of contact at the extreme ends of each track, somewhat as it were on wheels instead of tracks.

Figure 7B:
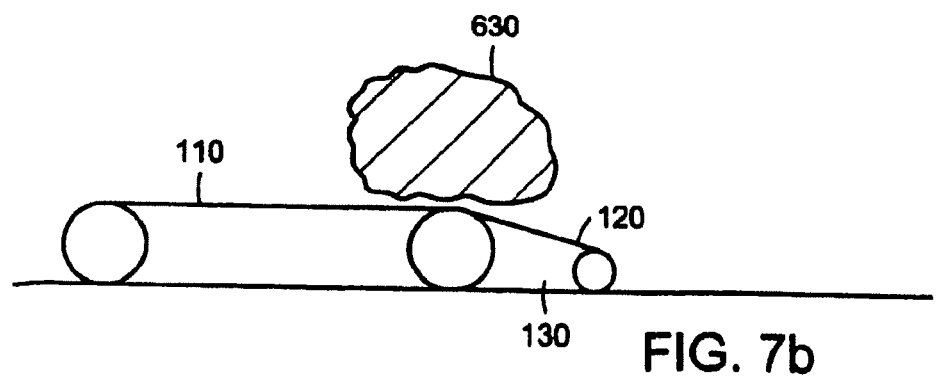
FIGS. 7b-c are schematic side views of a maneuver to raise an object using the inclined position.
Figure 7C:
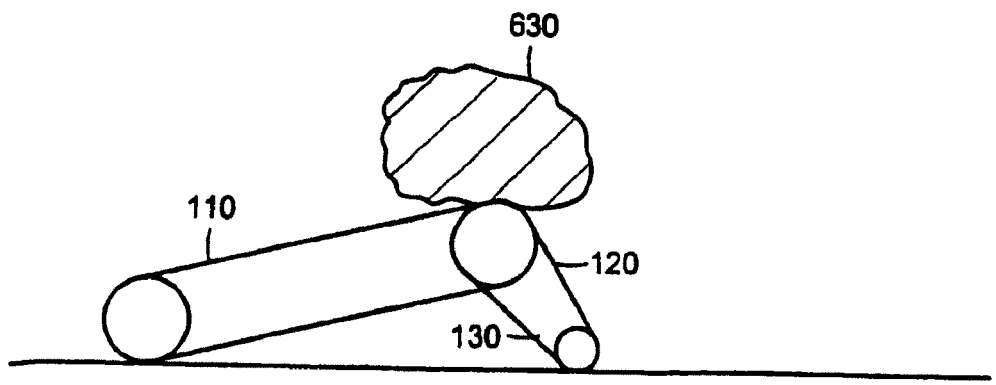

Referring to FIGS. 7b-c, by combining the inclined mode with the fully extended mode, the robot can lift and carry objects, rather like a forklift. Referring to FIG. 7b, robot 100 first adopts the fully extended position with its arms 130 outstretched and then maneuvers its arms under an object 630 to be carried or lifted. Referring to FIG. 7c, robot 100 then raises itself into the inclined mobility position, thus raising object 630. The object needs to be small enough to fit between the tracks, of course, in order to be carried away by the robot.

Figure 8A:
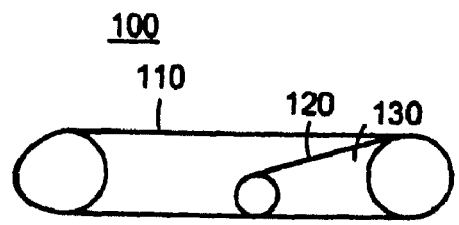
FIGS. 8a-c are schematic side views of a maneuver to achieve an upright position.
Figure 8B:
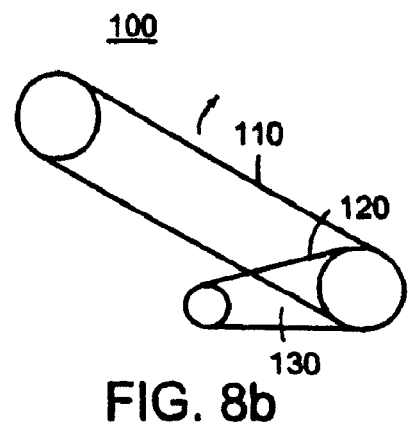
Figure 8C:
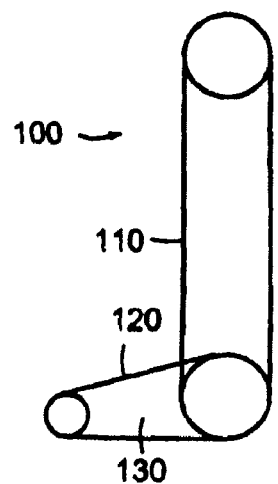

Referring to FIGS. 8a-c, to assume an upright "prairie dog" mode, robot 100 balances the main body on arms 130. Referring to FIG. 8a, robot 100 begins in a stowed position, and then using articulator drive motor 372 (FIG. 3c) applies a torque to the arms. Since the center of gravity is within arc of the arms (as shown in FIG. 3b), the main body is raised (FIG. 8b) until it reaches a high position (FIG. 8c) which is short of the point at which the robot would topple. As is described further below, this upright position allows sensors to be placed at the highest possible elevation, and also provides the smallest possible wheel base. In this upright mobility mode, the robot is able to drive on the front tracks and to pivot in place with the tracks staying within a small circle, in principle, as small as 60 cm (23.6") diameter. Therefore, the upright mobility position is useful for navigating in narrow corridors and passageways.

Figure 9:
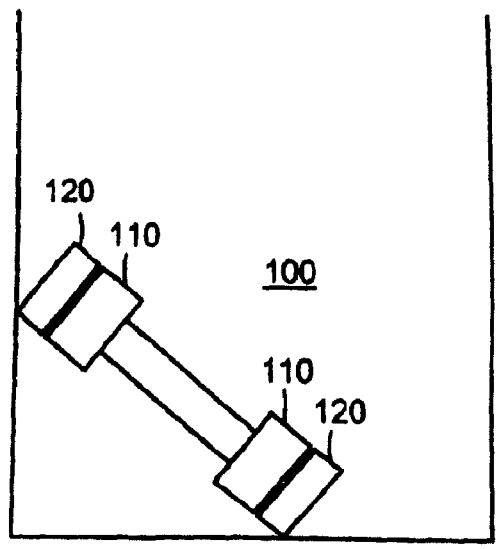
FIG. 9 is a schematic front view of the "wheelie" position.

Referring to FIG. 9, a side "wheelie" mobility mode is used to navigate a passageway that is even smaller than the width of the robot in the upright position. In the side wheelie mode, the robot rests one track on the side wall and the other track on the floor. It then moves forward in a tilted orientation as shown.

Figure 10A:
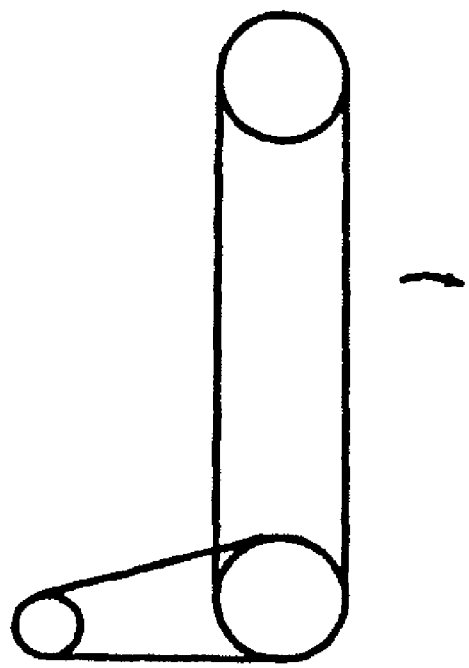
FIGS. 10a-b are schematic side views of a self-righting maneuver.
Figure 10B:
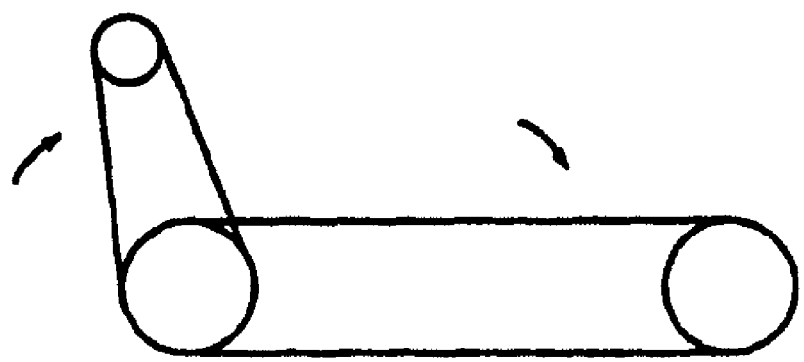

Referring to FIG. 10a-b, a self righting maneuver is related to the upright mobility mode. In this maneuver, in order to invert itself, the robot begins in a stowed mode and raises itself as it does when attaining the upright mobility mode (FIGS. 8a-c). However, rather than stopping in the upright position shown in FIG. 10a rotation is continued past the vertical point and the robot falls over (FIG. 10b), thereby completing the inversion.

Referring to FIG. 11, robot 100 can raise arms 130 in order to mount an obstacle, such as a stair 1010, in its path. To mount the first step of staircase 1110, robot 100 raises its arms 130 and drives forward to raise its main tracks 110 onto the first stair. The robot then assumes a fully extended mode thereby extending its wheelbase to increase it stability and to provide as smooth a ride a possible up the stairs. Soft cleats 350 (not shown in FIG. 11) provide mechanical locking with the stair edge needed to drive the robot up the stairs.

Robot 100 is specifically dimensioned to climb common stairs in this version, with step dimensions of up to a 17.8 cm (7") rise and 27.9 cm (11") tread. As the robot tilts or inclines, the vertical projection of the center of gravity (CG) with respect to the ground moves backwards. For stable travel on stairs, the extended wheel base of the main and forward tracks in the fully extended mode span a minimum of two steps (i.e. at least 66.2 cm (26.1") for 17.8 cm (7") by 27.9 cm (11") stairs) such that the vehicle is supported by at least two stair treads at all times. Note that robot 100 can climb larger stairs for which it cannot span two steps, but the traverse will not be as smooth as the robot will bob with each step.

To avoid nosing up or down (pitch instability) while climbing stairs, the vertical projections of the center of gravity is located in a stable range which is at least one step span (i.e., 33.1 cm (13") for 17.8 cm (7") by 27.9 cm (11") stairs) in front of the furthest rear main track ground contact and at least one step span behind the front most front track ground contact.

Alternative versions of the robot can use shorter track dimensions that do not satisfy the requirement of spanning two steps, and the center of gravity can be outside the stable range. Although such robots may not be as stable on stairs, inertial effects add to dynamic stability at increased velocities, smoothing the traverse on stairs. Also, the front extremities of arms 130 can be weighted to move the center of gravity forward in the fully extended position. However, adding weight at the end of the arms also has the negative effect of reducing robustness.

Figure 12A:
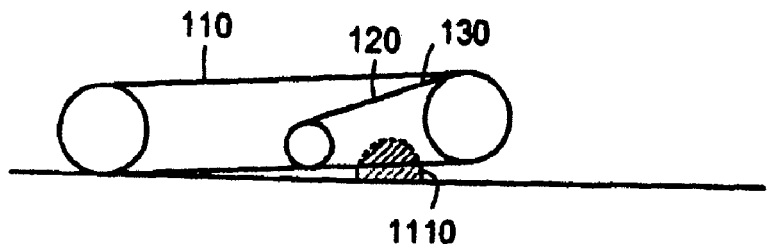
FIGS. 12a-c are schematic side views of a maneuver to recover from a high centering.
Figure 12B:
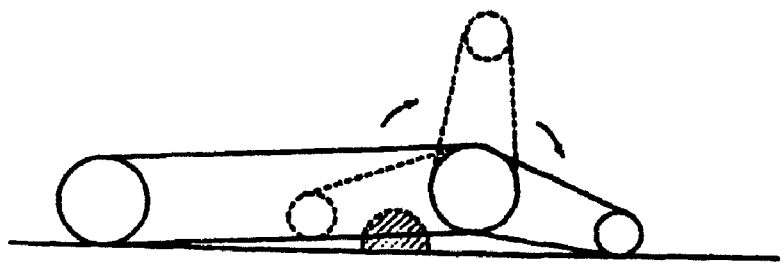
Figure 12C:
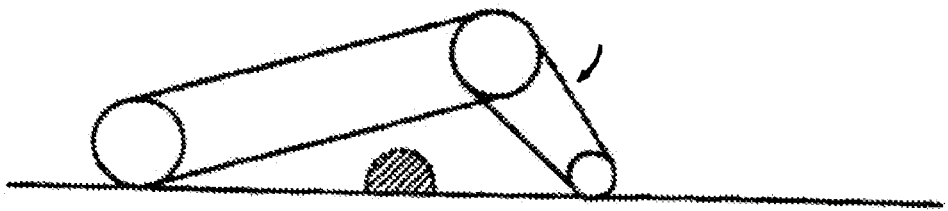

Referring to FIGS. 12a-c, robot 100 has relatively small vertical clearance below its main body. In this version of the robot, in order to accommodate the drive motors and gearing within the front section of the mobility platform resulted in only 4.11 cm (1.6") ground clearance on both top and bottom of the robot. Referring to FIG. 12a, robot 100 can lose traction in a high centering situation in which it rests on an obstacle 1110. Referring to FIGS. 12b-c, arms 130 are lowered (illustrated here as swinging clockwise to the front of the robot) to gain traction with the ground and then the robot can drive away in the inclined mobility mode.

Figure 13:
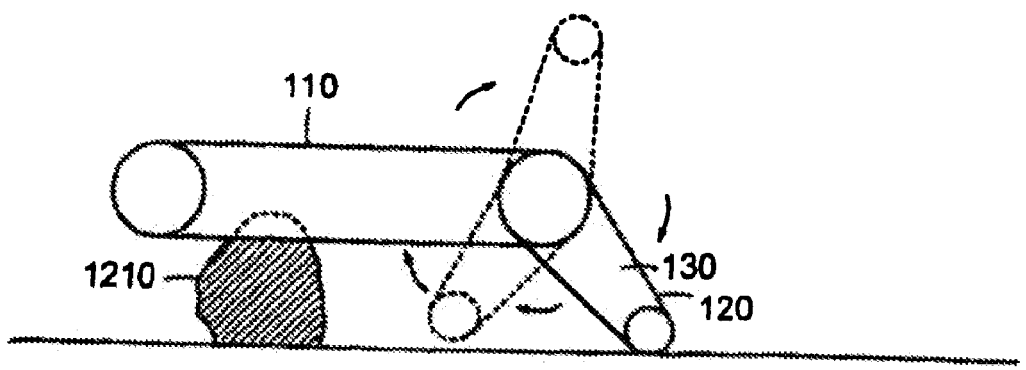
FIG. 13 is a schematic side view illustrating "paddling" using the arms.

Referring to FIG. 13, another mode of recovery from high centering makes use of continuous rotation of arms 130. Continuous rotation in one direction essentially "paddles" the robot off obstacle 1210 using only the articulator drive motor 370, for example.

Note that the likelihood of a high centering situation is reduced for robot 100 since approximately half of the frontal area that is tracked. Therefore, obstacles are as likely to encounter the tracks as to pass under the main body.

The robot's low and forward positioned center of gravity also allows the robot to climb steep inclines, given enough traction, without the robot toppling. Based on the location of the center of mass, this version of the robot can, in principal, climb a 77□ incline.

Robot 100 includes the capability of carrying a variety of sensors, including cameras, sonar sensors, infra-red detectors, inertial sensors, motor position, velocity and torque sensors, inclinometers, a magnetic compass, and microphones. Sensors can be placed on all surfaces of the robot.

Sensors can be shielded within the track volume or within the protective shell of the main body. The front and rear of the vehicle has room for sensors within the 24.4 cm (10") width not covered by tracks, although the rear is partially occluded by the rear handle. The top and bottom of payload volume 370 (FIG. 3c) is free for sensor placement, as are side plates 312. Sensors mounted to the front of arm supports 362 are occluded when arms 130 are stowed. Sensors can also be mounted on arm side plates 332. Articulator axle 330 is hollow allowing power and signal cables from the arms to pass to a slip ring allowing continuous rotation of the arms. The robot's self-righting capability permits the use of fewer specialty sensors since not all sensors have to be duplicated on both the top and the bottom of the main body. When there is redundancy of sensors on both the top and bottom of the robot, this feature allows the robot to continue functioning if one or more of its sensors fails—it simply inverts and uses the undamaged sensors on the other side.

Figure 14A:
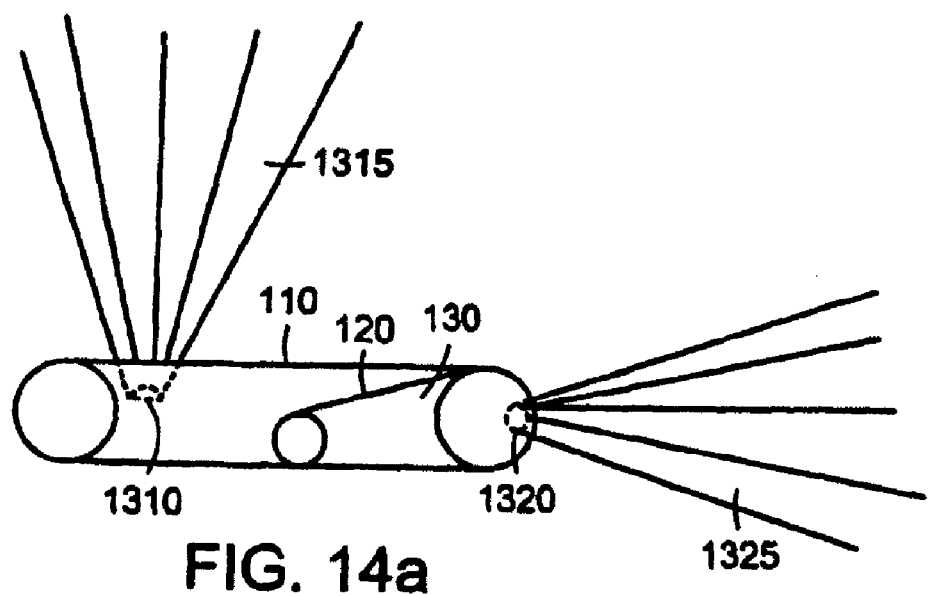
FIGS. 14a-b are schematic views showing camera placement.
Figure 14B:
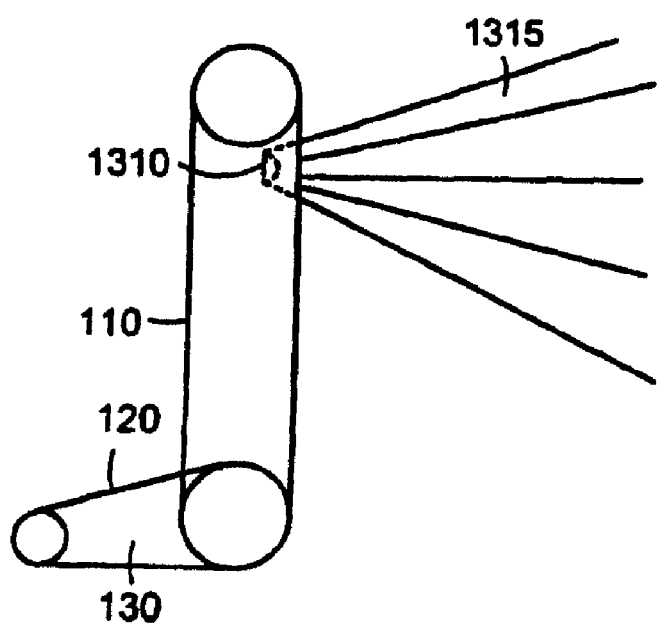

Referring to FIGS. 14*a-b*, a two- or three-camera array 1310, which is used for stereoscopic vision, is placed at the top of the robot for operation predominantly in the upright mobility position only (FIG. 14*b*). Another camera 1320 is placed at the front of the robot for navigation and video transmission back to remote control system 150. Camera array 1310 and camera 1320 have fields of view 1315 and 1325 respectively. A microphone (not shown) is placed at the front for surveillance and for providing directional information. A rate gyroscope is placed near the center of gravity 364 of the robot. Optional accelerometers can be located near the rate gyroscope.

Figure 15A:
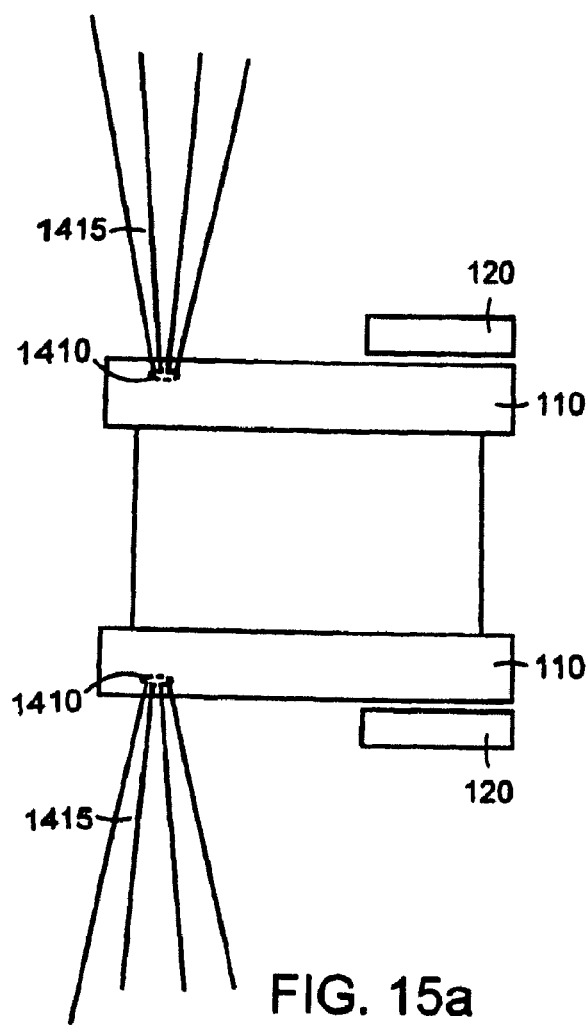
FIGS. 15a-b are schematic views showing placement of sonar sensors.
Figure 15B:
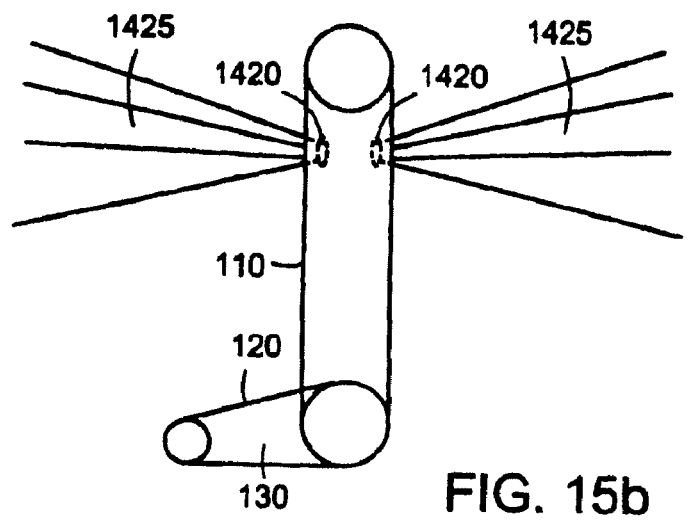

Referring to FIGS. 15*a-b*, two sonar sensors 1420 are placed at the top and bottom of the robot respectively, for operation in the upright position (FIG. 15*b*). Two more sonar sensors 1410 are placed on the sides of the robot to be as high as possible when the robot is in the upright position. The sonar sensors are positioned high off the ground because they have a fairly large cone of sensitivity, and may be confused by the ground or very small objects if placed low to the ground.

Figure 16A:
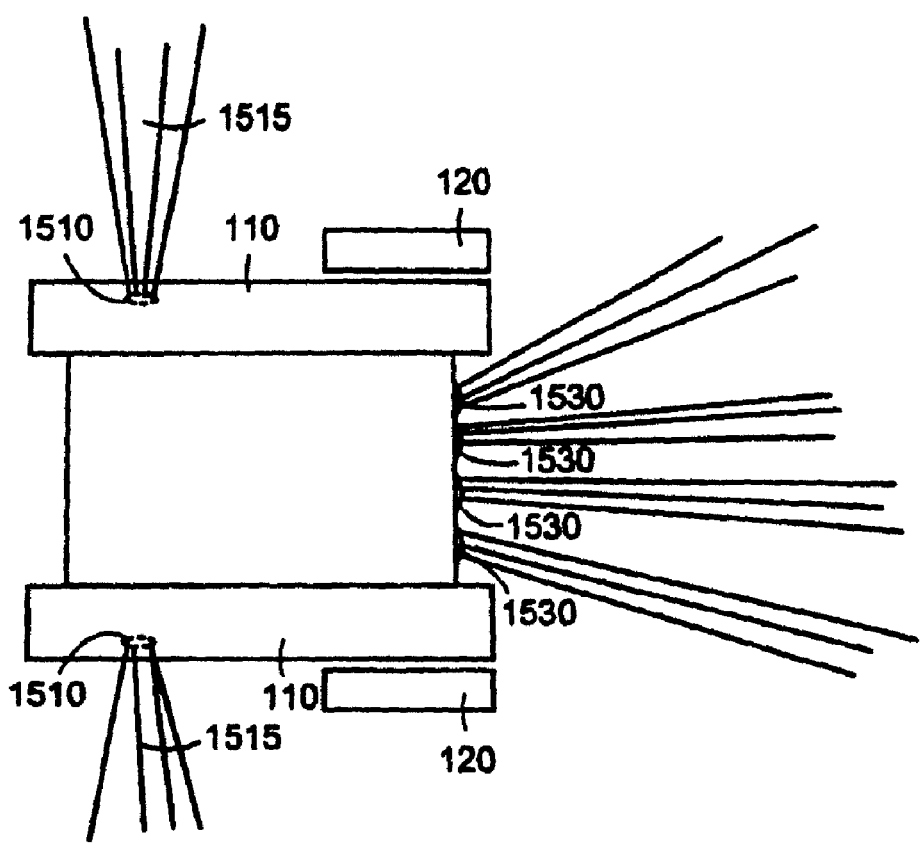
FIGS. 16a-b are schematic views showing placement of infra-red sensors.
Figure 16B:
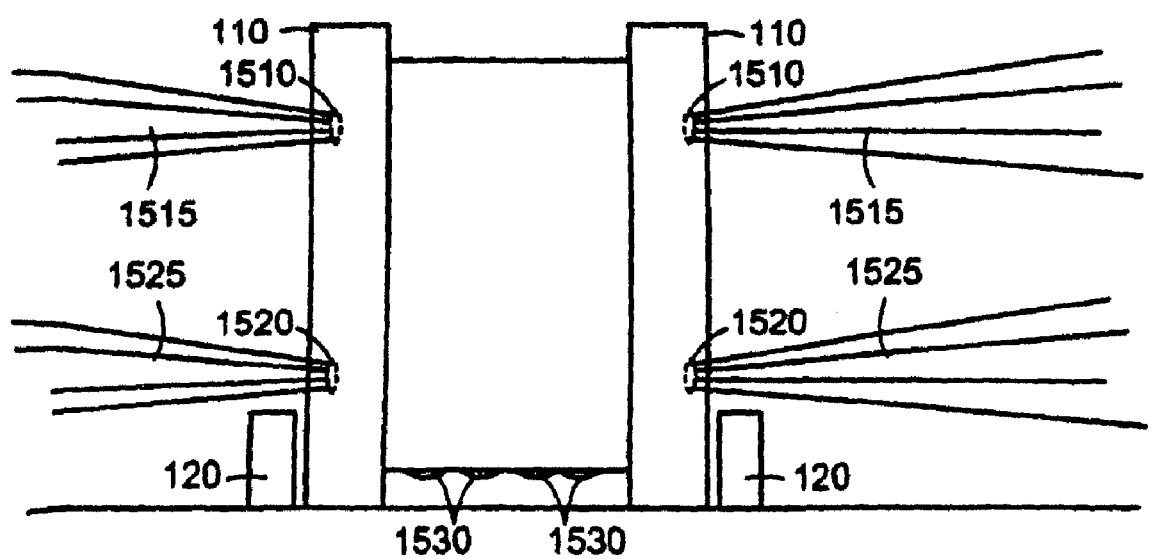

Referring to FIGS. 16*a-b*, four infrared sensors 1530 are placed at the front of the robot, and two on each side 1510 and 1520, one in the back and one in the front. The side-back IR's are in the same position as the side sonar sensors and can be used in either upright or stowed position, while the side-front infra-red sensors 1520 are occluded by the arms in stowed position and are only used in upright position.

In this version of the robot, there are no rear-facing sensors, although they can be added if needed. Robot 100 can move to its upright mobility position to use the sonar sensor on the bottom of the robot. Or, it can rotate quickly in either the stowed position or the upright position, which has a very small turn radius, to use its entire sensor suite to acquire information about the environment in any direction.

Figure 17:
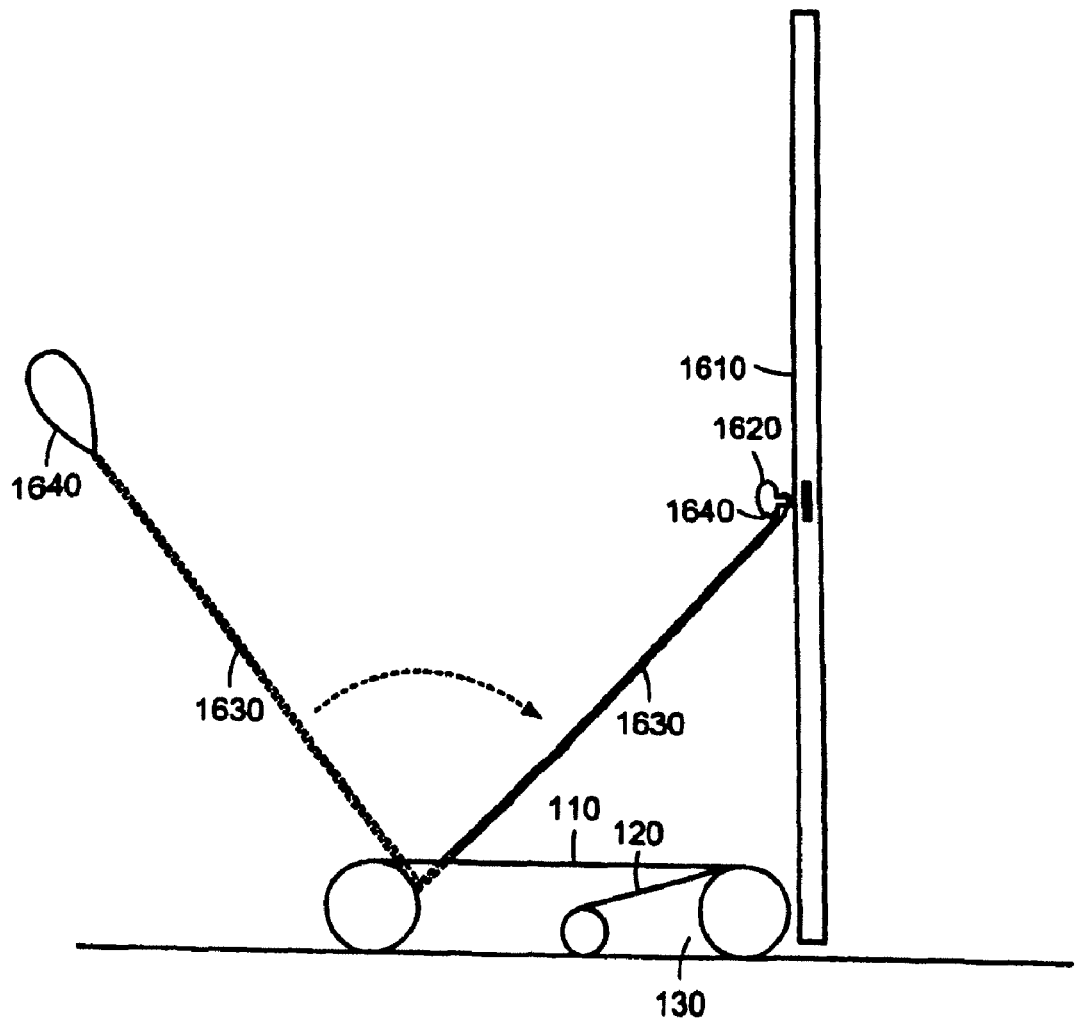
FIG. 17 is a diagram showing a door opening mechanism.

In addition to placing sensors directly on the outside surface of the robot, a retractable sensor mast can be extended away from the top or the bottom of the robot. Sensors, such as cameras, can be mounted on the sensor mast. Robot 100 can include a variety of manipulators. Referring to FIG. 17, one such manipulator is a door opening mechanism that allows robot 100 to open a closed door with a standard height door knob 1620. An extendable mast 1630 is attached to the robot. Mast 1630 has a high friction, flexible hoop 1640 at the top of the mast. Hoop 1640 is rotated by an actuator located within the attachment section of the hoop and mast. The procedure for engaging door knob 1620 is reminiscent of a ring toss game. The object is to place the hoop, which remains attached to the mast, over the door knob. Once the hoop is over the door knob, the mast retracts to snug the hoop against the door knob. The hoop is then rotated and the door knob is rotated due to the frictional forces holding the hoop against the door knob. Once the door has been jarred opened, the mast extends to disengage the hoop from the doorknob.

Alternative versions of the robot can be completely waterproofed, thereby allowing underwater operation. Also, larger or smaller versions of the robot can be used for different applications. The drive system in other versions of the robot can allow independent rotation of the arm on each side of the robot, and separate drive motors for the main and front tracks can be used.

Remote control system 150 (FIG. 1) provides a user interface to operator 160 that allows teleoperation of robot 100.

Alternative versions of the remote control system 150 support teleoperation as well as a means of switching between teleoperation and autonomous control. The user interface permits transitions between autonomous and teleoperated control that are almost imperceptible to the user. That is, the user can interrupt autonomous operation of the robot at any time to give commands and direction, and the robot would operate autonomously when not receiving particular directions from the user. The system provides a predetermined warning signals to the operator, for instance if it is unable to operate autonomously, possibly by means of a vibrating unit that could be worn by the operator and which would be effective in a noisy environment. In addition, the user can add additional tasks to the robot's mission and request notification from the robot when milestone tasks have been achieved.

Versions of the robot can perform various autonomous tasks which can be initiated by the operator from remote control system 150. These include obstacle avoidance, wall following, climbing stairs, recovery from high centering, returning "home," opening doors, searching for a designated object, and mapping. The robot can use the various mobility modes described above in these autonomous operations, and if necessary, can call for operator assistance during its execution of a task. Alternative configurations of articulated bodies can be used. For example, a single central "arm" can be used and the arm or arms do not necessarily have to be tracked.

Other embodiments of the invention are within the scope of the following claims.

What is claimed is:
1. A robotic platform comprising:
a main body;
right and left main tracks disposed on corresponding sides of the main body, each main track trained about a corresponding main drive pulley and a corresponding rear idler pulley;
right and left front tracks pivotally coupled to a forward portion of the main body, each front track trained about a corresponding front drive pulley and a corresponding front idler pulley, each front drive pulley being concentric with and coupled to rotate in unison with the corresponding main drive pulley, wherein each of the front tracks and the main tracks are compliant tracks that provide a first layer of impact protection to the main body, and wherein each of the drive and idler pulleys are formed from a compliant polymer to provide a second layer of impact protection to the main body;
right and left track motors respectively driving the right main and front drive pulleys and left main and front drive pulleys, the right and left track motors being differentially driven to provide skid steering; and
at least one articulator drive motor coupled to right and left front tracks, the articulator drive motor rotating the right and left front tracks in a continuous 360 degrees between a stowed position, in which the front tracks are disposed along the main body and main tracks and within the height of the main tracks so that the main body is protected by the first and second layers of impact protection, and the front tracks provide traction with the main tracks in a compact track configuration to propel the robotic platform, and at least one deployed position, in which the front tracks are pivoted at an angle with respect to the main tracks;

wherein the robotic platform assumes the stowed position without operator intervention when the robotic platform detects that it is in free fall using a sensor system.

2. The robotic platform of claim 1, further comprising an articulator axle coupled to the front tracks and passing through the main drive pulleys and front drive pulleys to pivot with respect to the main body, the front tracks pivoting in unison.

3. The robotic platform of claim 1, wherein the combination of main tracks and front tracks, trained about the right main drive pulley and front drive pulley and the left main drive pulley and front drive pulley, provide an extended wheel base, all the right main drive pulley, right front drive pulley, left main drive pulley, and left front drive pulley being of substantially similar diameter, and wherein the extended wheel base is sufficiently long to span a minimum of two stair steps of 7" rise by 11" tread stairs at all times, and the center of gravity of the robotic platform is located so that the robotic platform remains statically stable as it climbs stair steps of 7" rise by 11" tread stairs.

4. The robotic platform of claim 1, wherein the front drive pulleys have a larger diameter than the front idler pulleys, thereby tapering the front tracks.

5. The robotic platform of claim 1, wherein the front tracks are narrower than the main tracks.

6. The robotic platform of claim 5, wherein a width of each front track is about ⅔ a width of one of the main tracks.

7. The robotic platform of claim 1, further comprising a camera housed in a forward portion of the main body and arranged to provide a forward field of view along a driving direction of the robotic platform that is unobstructed by movement of the front tracks.

8. The robotic platform of claim 1, wherein the main body defines a volume less than a main tracks volume defined between the right and left main tracks.

9. The robotic platform of claim 1, wherein each track support compliantly supports the corresponding track.

10. A robotic platform comprising:
a main body;
right and left main tracks disposed on corresponding sides of the main body, each main track trained about a corresponding main drive pulley and a corresponding rear idler pulley;
right and left front tracks pivotally coupled to a forward portion of the main body, each front track trained about a corresponding front drive pulley and a corresponding front idler pulley, each front drive pulley being concentric with and coupled to rotate in unison with the corresponding main drive pulley;
right and left track motors respectively driving the right main and front drive pulleys and left main and front drive pulleys, the right and left track motors being differentially driven to provide skid steering;
at least one articulator drive motor coupled to right and left front tracks, the articulator drive motor rotating the right and left front tracks in a continuous 360 degrees between a stowed position, in which the front tracks are disposed along the main body and main tracks and within the height of the main tracks, and the front tracks provide fraction with the main tracks in a compact track configuration to propel the robotic platform, and at least one deployed position, in which the front tracks are pivoted at an angle with respect to the main tracks; and a slip clutch coupled between the articulator drive motor and the front tracks, the slip clutch enabling rotation of the front tracks without rotation of the articulator drive motor when a torque between at least one front tracks and the main body, caused by a force acting on the at least one track, exceeds a maximum torque that can be provided by the articulator drive motor.

11. The robotic platform of claim 10, further comprising a drive coupling the articulator drive motor to the slip clutch, the slip clutch is coupled to an articulator axle coupled to the front tracks to rotate the front arms about the main drive pulley axis, the drive providing a gear reduction between the articulator drive motor and the articulator axle.

12. The robotic platform of claim 10, wherein the slip clutch slips in excess of a torque of approximately 127 N-m applied to the front arms permitting the front tracks to rotate with respect to the drive.

13. A robotic platform comprising:
a main body;
right and left main tracks disposed on corresponding sides of the main body, each main track trained about a corresponding main drive pulley and a corresponding rear idler pulley;
right and left front arms pivotally coupled by an articulator axle passing through a forward portion of the main body to pivot with respect to the main body, each front arm including:
an arm plate having proximal and distal ends;
a front drive pulley rotatably coupled to the proximal end of the arm plate, the front drive pulley being concentric with and coupled to rotate in unison with the corresponding main drive pulley;
a front idler pulley rotatably mounted at the distal end of the arm plate, and
a front arm track trained about the front drive pulley and front idler pulley;
right and left track motors respectively driving the right main and front drive pulleys and left main and front drive pulleys, the right and left track motors being differentially driven to provide skid steering; and
an articulator drive motor coupled to the articulator axle, the articulator axle rigidly coupling the arm plates of the front arms, the articulator drive motor pivoting the articulator axle and front arms in unison among different mobility modes of the robotic platform, including:
an extended mobility mode in which the front arms are pivoted, at an angle with respect to the main tracks, forward of the main body and a center of gravity of the robotic platform is located at least 13 inches rearward of a distal end of the front arms and at least 13 inches forward of the rear most point of the main tracks;
an inclined mobility mode in which the front arms are pivoted to an angle with respect to the main tracks inclining the main body such that the robotic platform travels on only four points of contact at the extreme ends of the main tracks and front tracks; and
an upright mobility mode in which the front arms are pivoted to an angle with respect to the main tracks to balance the main body on the front arms, and in which the robotic platform is able to drive on the front tracks and to pivot in place.

14. The robotic platform of claim 13, wherein the front drive pulleys have a larger diameter than the front idler pulleys, thereby tapering the front tracks.

15. The robotic platform of claim 13, further comprising a camera housed in a forward portion of the main body and arranged to provide a forward field of view along a driving direction of the robotic platform that is unobstructed by movement of the front tracks.

16. A robotic platform comprising:
a main body;
right and left main tracks disposed on corresponding sides of the main body, each main track trained about a corresponding main drive pulley and a corresponding rear idler pulley;
right and left front arms pivotally coupled by an articulator axle passing through a forward portion of the main body to pivot with respect to the main body, each front arm including:
an arm plate having proximal and distal ends;
a front drive pulley rotatably coupled to the proximal end of the arm plate, the front drive pulley being concentric with and coupled to rotate in unison with the corresponding main drive pulley;
a front idler pulley rotatably mounted at the distal end of the arm plate, and
a front arm track trained about the front drive pulley and front idler pulley;
right and left track motors respectively driving the right main and front drive pulleys and left main and front drive pulleys, the right and left track motors being differentially driven to provide skid steering;
an articulator drive motor coupled to the articulator axle, the articulator axle rigidly coupling the arm plates of the front arms, the articulator drive motor pivoting the articulator axle and front arms in unison among different mobility modes of the robotic platform, including:
an extended mobility mode in which the front arms are pivoted, at an angle with respect to the main tracks, forward of the main body and a center of gravity of the robotic platform is located at least 13 inches rearward of a distal end of the front arms and at least 13 inches forward of the rear most point of the main tracks;
an inclined mobility mode in which the front arms are pivoted to an angle with respect to the main tracks inclining the main body such that the robotic platform travels on four points of contact at the extreme ends of the main tracks and front tracks; and
an upright mobility mode in which the front arms are pivoted to an angle with respect to the main tracks to balance the main body on the front arms, and in which the robotic platform is able to drive on the front tracks and to pivot in place; and
a slip clutch coupled between the articulator drive motor and the front arms, the slip clutch enabling rotation of the front arms without rotation of the articulator drive motor when a torque between at least one front arm and the main body, caused by a force acting on the at least one arm, exceeds a maximum torque that can be provided by the articulator drive motor.

17. The robotic platform of claim 16, further comprising a drive coupling the articulator drive motor to the slip clutch, the slip clutch is coupled to an articulator axle coupled to the front arms to rotate the front arms about the main drive pulley axis, the drive providing a gear reduction between the articulator drive motor and the articulator axle.

18. The robotic platform of claim 16, wherein the slip clutch slips in excess of a torque of approximately 127 N-m applied to the front arms permitting the front arms to rotate with respect to the drive.

19. A robotic platform comprising:
a main body;
right and left main tracks disposed on corresponding sides of the main body, each main track trained about a corresponding main drive pulley and a corresponding rear idler pulley;
right and left main track supports supporting the corresponding right and left main tracks, each main track support disposed between the corresponding main drive pulley and rear idler pulley;
right and left front tracks pivotally coupled to a forward portion of the main body, each front track trained about a corresponding front drive pulley and a corresponding front idler pulley, each front drive pulley being concentric with and coupled to rotate in unison with the corresponding main drive pulley, wherein each of the front tracks and the main tracks are compliant tracks that provide a first layer of impact protection to the main body, and wherein each of the drive and idler pulleys are formed from a compliant polymer to provide a second layer of impact protection to the main body;
right and left front track supports supporting the corresponding right and left front tracks, each front track support disposed between the corresponding front drive pulley and front idler pulley;
right and left track motors respectively driving the right main and front drive pulleys and left main and front drive pulleys, the right and left track motors being differentially driven to provide skid steering; and
an articulator drive motor coupled to right and left front tracks, the articulator drive motor rotating the right and left front tracks between at least one angled position, in which the front arms are pivoted at an angle with respect to the main tracks, a stowed position, in which the front tracks are disposed along the main body and main tracks and within the height of the main tracks so that the main body is protected by the first and second layers of impact protection, and the front tracks provide traction with the main tracks in a compact track configuration to propel the robotic platform, and an extended position, in which the front arms are pivoted to align substantially parallel to the main tracks;
wherein the robotic platform assumes the stowed position without operator intervention when the robotic platform detects that it is in free fall using a sensor system.

20. The robotic platform of claim 19, further comprising an articulator axle coupled to the front tracks and passing through the main drive pulleys and front drive pulleys to pivot with respect to the main body, the front tracks pivoting in unison.

21. The robotic platform of claim 19, wherein the combination of main tracks and front tracks, trained about the right main drive pulley and front drive pulley and the left main drive pulley and front drive pulley, provide an extended wheel base, all the right main drive pulley, right front drive pulley, left main drive pulley, and left front drive pulley being of substantially similar diameter, and wherein the extended wheel base is sufficiently long to span a minimum of two stair steps of 7" rise by 11" tread stairs at all times, and the center of gravity of the robotic platform is located so that the robotic platform remains statically stable as it climbs stair steps of 7" rise by 11" tread stairs.

22. The robotic platform of claim 19, wherein the front drive pulleys have a larger diameter than the front idler pulleys, thereby tapering the front tracks.

23. The robotic platform of claim 19, wherein the front tracks are narrower than the main tracks.

24. The robotic platform of claim 23, wherein a width of each front track is about ⅔ a width of one of the main tracks.

25. The robotic platform of claim 19, further comprising a camera housed in a forward portion of the main body and arranged to provide a forward field of view along a driving direction of the robotic platform that is unobstructed by movement of the front tracks.

26. The robotic platform of claim 19, wherein the main body defines a volume less than a main tracks volume defined between the right and left main tracks.

27. A robotic platform comprising:
a main body;
right and left main tracks disposed on corresponding sides of the main body, each main track trained about a corresponding main drive pulley and a corresponding rear idler pulley;
right and left main track supports supporting the corresponding right and left main tracks, each main track support disposed between the corresponding main drive pulley and rear idler pulley;
right and left front tracks pivotally coupled to a forward portion of the main body, each front track trained about a corresponding front drive pulley and a corresponding front idler pulley, each front drive pulley being concentric with and coupled to rotate in unison with the corresponding main drive pulley;
right and left front track supports supporting the corresponding right and left front tracks, each front track support disposed between the corresponding front drive pulley and front idler pulley;
right and left track motors respectively driving the right main and front drive pulleys and left main and front drive pulleys, the right and left track motors being differentially driven to provide skid steering;
an articulator drive motor coupled to right and left front tracks, the articulator drive motor rotating the right and left front tracks between at least one angled position, in which the front arms are pivoted at an angle with respect to the main tracks, a stowed position, in which the front tracks are disposed along the main body and main tracks and within the height of the main tracks, and the front tracks provide traction with the main tracks in a compact track configuration to propel the robotic platform, and an extended position, in which the front arms are pivoted to align substantially parallel to the main tracks; and
a slip clutch coupled between the articulator drive motor and the front tracks, the slip clutch enabling rotation of the front tracks without rotation of the articulator drive motor when a torque between at least one front tracks and the main body, caused by a force acting on the at least one track, exceeds a maximum torque that can be provided by the articulator drive motor.

28. The robotic platform of claim 27, further comprising a drive coupling the articulator drive motor to the slip clutch, the slip clutch is coupled to an articulator axle coupled to the front tracks to rotate the front arms about the main drive pulley axis, the drive providing a gear reduction between the articulator drive motor and the articulator axle.

29. The robotic platform of claim 27, wherein the slip clutch slips in excess of a torque of approximately 127 N-m applied to the front arms permitting the front tracks to rotate with respect to the drive.

* * * * *